Oct. 17, 1950     G. A. NAGEL     2,525,824
TRAFFIC COUNTING APPARATUS
Filed Sept. 12, 1947     6 Sheets—Sheet 1
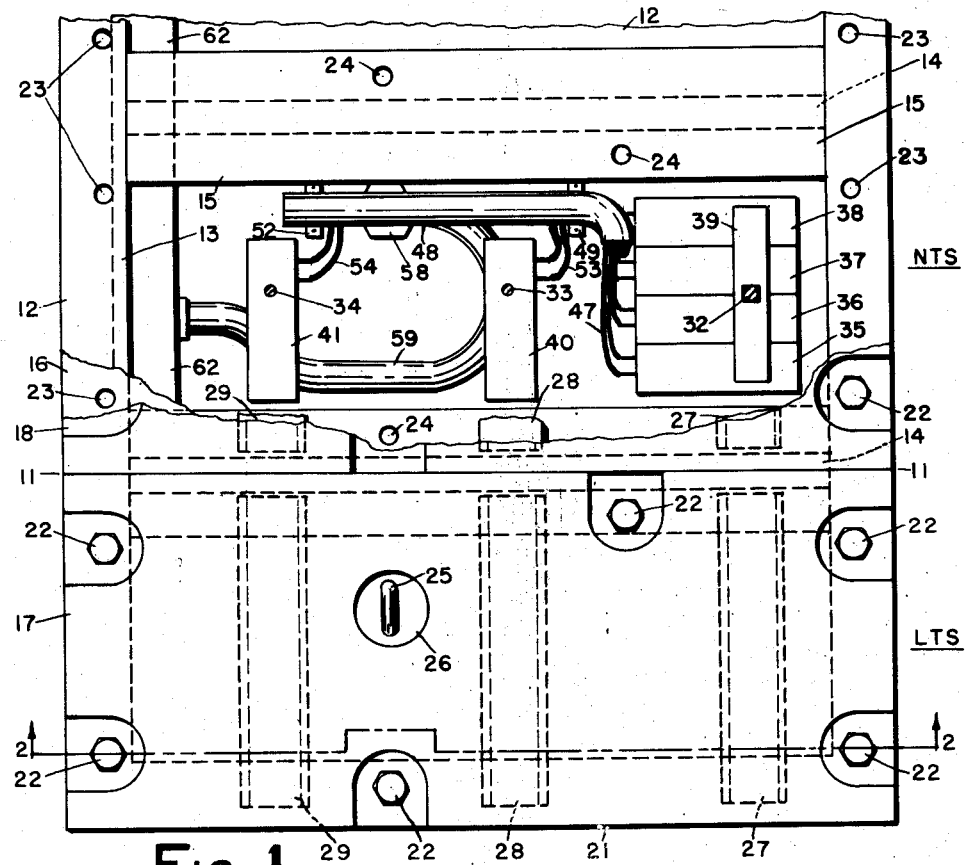
Fig. 1
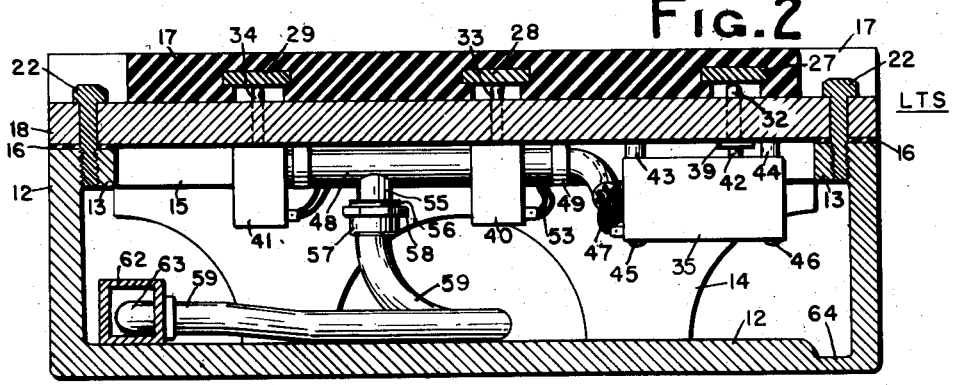
Fig. 2
Fig. 3
INVENTOR.
GEORGE A. NAGEL
BY
ATTORNEY Oct. 17, 1950 G. A. NAGEL 2,525,824
TRAFFIC COUNTING APPARATUS
Filed Sept. 12, 1947 6 Sheets-Sheet 2

*INVENTOR.*
GEORGE A. NAGEL
BY *Edward H Lauro*
ATTORNEY

Oct. 17, 1950 G. A. NAGEL 2,525,824
TRAFFIC COUNTING APPARATUS
Filed Sept. 12, 1947 6 Sheets-Sheet 4

INVENTOR.
GEORGE A. NAGEL
BY Edward H. Eames
ATTORNEY

Oct. 17, 1950   G. A. NAGEL   2,525,824
TRAFFIC COUNTING APPARATUS
Filed Sept. 12, 1947   6 Sheets-Sheet 5

INVENTOR.
GEORGE A. NAGEL
BY Edward W. Eames
ATTORNEY

Oct. 17, 1950 G. A. NAGEL 2,525,824
TRAFFIC COUNTING APPARATUS
Filed Sept. 12, 1947 6 Sheets-Sheet 6

*INVENTOR.*
GEORGE A. NAGEL
BY Edward H. Cairns
ATTORNEY

Patented Oct. 17, 1950

2,525,824

UNITED STATES PATENT OFFICE 2,525,824

TRAFFIC COUNTING APPARATUS

George A. Nagel, Chester, Conn., assignor to Eastern Industries, Incorporated, East Norwalk, Conn., a corporation of Delaware Application September 12, 1947, Serial No. 773,622

17 Claims. (Cl. 235—92)

This invention relates generally to traffic counting or classification apparatus for use on vehicle traffic roadways, or airfield landing runways, or taxi strips, or at toll collection stations for vehicle traffic on roads or bridges for example.

The invention relates more particularly to a traffic counting or classification apparatus for counting or classifying vehicle traffic automatically in different classification groups in accordance with the grouping of wheels and axles.

In a preferred embodiment of the invention for example for use at traffic classification counting stations such as a toll station, the apparatus employs a contact treadle for insertion in the roadway for actuation by vehicles rolling over it, this treadle being sectionalized transversely with respect to the roadway so that different wheels on the same axle of the vehicle will actuate different sections of the treadle. The treadle incorporates switches or contact members which are closed or opened by actuation by a vehicle wheel on the surface of the treadle section, and the switches or contact members in the several sections are connected to relay circuits in accordance with the invention to distinguish by operation of different relays the actuations by a vehicle axle having single wheels on each side and by an axle having dual wheels on each side, for example.

One wheel on one axle on one side of a vehicle is referred to as a single wheel and a front or rear axle with a single wheel at each end is referred to as a single wheel axle. Two wheels on one axle on one side of a vehicle are referred to as dual wheels and an axle with dual wheels at each end is referred to as dual wheel axle.

One of the long standing problems in the checking of toll collections on toll bridges and toll roads has been to obtain an adequate check of the number of vehicles of different classes such as passenger cars or light delivery trucks and the heavier trucks of different sizes. It is the accepted practice to charge a higher toll for heavy trucks than for light trucks or passenger cars at a large number of toll stations handling a heavy volume of mixed traffic.

At many toll stations it is customary for the toll collector to register on a keyboard the different classifications of vehicles having correspondingly different toll charges, the collector pressing down a classification button on the keyboard to register one vehicle of that class at the time of each toll collection. Although class indicator signals are widely used to permit a supervisor to check on the toll collectors and various forms of spot checking are employed, frequent disputes arise from discrepancies between the usual automatic treadle count of all axles and the total number of axles computed from the totals of the several manually operated classification registers, and there is a temptation to toll collectors under the manual classification system to under-class to some extent the heavy trucks paying higher toll charges.

This problem is overcome in the automatic classification counting apparatus according to the present invention since the sectionalized treadle and associated relay circuits discriminate between single and dual wheels and sequences of single and dual wheel axles so as to classify vehicular traffic according to axle sequence and wheel sets. For example passenger cars and light delivery trucks with a 2-2 wheel arrangement will be recorded as two single wheel axles, passenger cars with one single wheel axle trailer having a 2-2-2 wheel arrangement will be recorded as three single wheel axles, six wheel trucks having a 2-4 wheel arrangement will be so recorded as one single wheel axle and one dual wheel axle, and ten wheel trailer trucks having a 2-4-4 wheel arrangement will be so recorded as one single wheel axle and a pair of dual wheel axles, the actuations from the one dual wheel axle of the 2-4 wheel set and from the pair of dual wheel axles in succession of the 2-4-4 wheel set being channeled to different counters to record separately the six wheel truck and the ten wheel truck for example.

In a further step in the classification counting circuit in accordance with the invention, any combination of three or more dual wheel axles in succession is channeled to a separate counter to identify and record fourteen wheel trucks 2-4-4-4 or larger.

The cash collections of the collector can therefore be reconciled by electro-mechanical means without dependence on the manual count made by the collector, and in the preferred embodiment of the invention, such manual count would be eliminated as being superfluous.

Another problem in toll collection in the past has been the rolling backward of occasional vehicles after overshooting the toll booth to some extent, and the past practice in general has been to have a separate counter for recording such roll-back actuations and to subtract the roll-back count total from the forward count total for comparison with the toll collections in auditing the collections.

In the traffic counting apparatus according to the invention, however, the roll-back actuations are applied against immediately preceding dual wheel actuations or immediately following forward single wheel actuations so as to provide a net forward count for each vehicle as will be more fully described below, and further, no roll-back or forward actuation will cause the associated circuits to operate until the vehicle wheel has actually left the directional treadle contacts and these contacts have been restored to normal.

It is an object of this invention to provide an improved traffic counting apparatus.

It is another object of the invention to provide traffic-actuated apparatus for distinguishing automatically between single and dual wheel traffic actuations.

It is a further object of the invention to provide apparatus for counting vehicle traffic automatically in classifications according to different sequences of single wheel axles and dual wheel axles on such vehicles.

It is an additional object of the invention to provide apparatus for obtaining automatically a net count of vehicle traffic actuations in the normal forward direction by balancing roll-back actuations in the reverse direction against forward actuations for each class of axle before counting, within the limits of the usual maximum number of axles per vehicle.

It is still another object of the invention to provide an improved sectionalized switch treadle for actuation by vehicle wheels.

It is still another object of the invention to permit the making of field repairs to the treadles from so called "packaged replacement units" and thus obviate the need for treadle removal as is the case with the usual treadles when treadle defects are found or improper counting actuations suspected.

Referring now to the accompanying drawings illustrating one embodiment of the invention:

Fig. 1 shows a partly cut away top view of one type of sectionalized switch treadle in accordance with one aspect of the invention.

Fig. 2 shows a vertical cross sectional view of one section of the treadle of Fig. 1 along line 2—2.

Fig. 3 is a top view of the sectionalized treadle showing several adjacent sections with the top assembly of some sections removed, and showing a break across the treadle to indicate that the treadle may have additional length and more sections.

Figs. 6, 7, 8 and 9 connect together at the wires shown at the edges of these drawings to show schematically one form of traffic counting apparatus for counting traffic by classification of single and dual wheel axles and sequences of these axles representing typical classes of vehicles.

Figure 4:
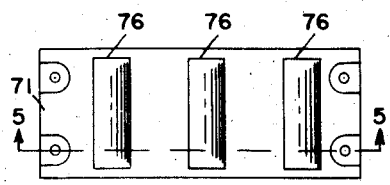
Figs. 4 and 5 show a top view and vertical cross section respectively of one form of three switch treadle section which may be employed in a sectionalized treadle in accordance with another aspect of the invention.
Figure 5:

Referring now to the sectionalized treadle which is shown in Figs. 1 through 5, one form of this treadle is shown in Figs. 1, 2 and 3 and an alternative form of treadle construction is shown in Figs. 4 and 5.

Referring first to Figs 1, 2 and 3, these figures show different views of the treadle, Fig. 3 showing a top overall view of the treadle illustrating a number of adjacent sections, 1TS, 2TS, 3TS, 4TS at one end of the treadle and sections NTS and LTS at the other end of the treadle. The treadle in Fig. 3 is shown with a break at section NTS for convenience of drawing only to indicate that the treadle may have a considerably larger number of sections than shown. One of the top sectional units of the treadle is shown removed in Fig. 3 for purpose of illustration only as will be explained in connection with the other figures but it will be understood that under normal operation conditions all of the top section units will be in place and the treadle will have the appearance in general of the left end of the treadle illustration in Fig. 3 extending from section 1TS to section 4TS for example.

Referring now to Figs. 1 and 2 showing adjacent sections NTS and LTS in the treadle, these sections are shown with LTS as the last section at one end of the treadle. However, from the viewpoint of Fig. 2, which shows a vertical view of the treadle in the direction shown on line 2—2 of the section LTS in Fig. 1, it will be understood that this cross sectional view is representative of any of the intermediate sections as well as the end section.

In Fig. 1 the lower section LTS is separable from the next section NTS along the joint line 11—11 between sections, the edges of the two sections being very closely adjacent or substantially in contact along this line but permitting the top section unit of each section to be removed independently of the other adjacent sections as further described below.

The treadle has a main base casing 12 having bottom and side walls, as best shown in sectional view in Fig. 2. This casing extends as a unit throughout the whole length of the treadle as indicated in Fig. 1 and the individual top section units LTS, NTS, etc. are mounted on top of flanges 13 formed at the top of the upstanding walls of the casing 12, with a gasket 16 preferably interposed between the flange 13 and the bottom of the top section unit.

The section NTS in Fig. 1 is shown partly broken away in order to reveal the underlying structure, and the casing 12 and other underlying structure of the treadle is also shown broken away at the top of Fig. 1 indicating that the view of Fig. 1 is only of one end of the treadle as illustrative of an end section and intermediate section, all of the intermediate sections being alike.

An arch shaped cross member 14 extends between the two side walls and bottom of the casing 12 at the side of each section, and this member has flanges 15 extending out from both sides at its top to support the edges of the top section units transverse to the length of the treadle. The gasket 16 underlies the flanges 13 of the casing 12 and also the flanges 15 of the cross member 14.

The top section unit has a flexible insulating cover 17 which is preferably of rubber or other similar material and which is preferably bonded to a base plate 18 which rests upon the gasket 16.

The entire treadle assembly is normally installed in the roadway with the top surface of the cover 17 flush with the surface of the roadway and with the normal direction of travel of vehicles passing over the treadle from right to left in Figs. 1 and 2.

The top section unit is fastened to the casing 12 and the cross member 14 by means of six bolts 22 which extend through clearance holes in the base plate 18 into threaded holes 23 and 24 in the flanges 13 and 15 respectively. Recesses are provided in the edges of the cover 17 to accommodate the heads of these bolts 22. It will be understood in this connection that the lower end of Fig. 1 illustrated an end section at one end of the treadle, and therefore the flange 13 would be extended along the end wall of the casing 12, across the lower edge of the treadle in Fig. 1, and the bolt 22 shown near the middle of this lower edge will fasten into a threaded hole in this end flange, but that the corresponding bolts in the intermediate section as well as the corresponding bolts in the opposite edge of the section LTS and intermediate sections will fasten into the flanges 15 of the cross member 14.

In this connection it will be understood that there will normally be a corresponding end wall at the opposite end of the treadle at section ITS for example in place of the cross member 14 as shown in Fig. 2.

A lift ring 25 is preferably provided in each section in a recess 26 in the cover 17, this ring being fastened into the base plate 18 to enable the section unit to be lifted readily when the bolts 22 are removed.

Three narrow plates 27, 28 and 29 are embedded in the cover 17 over rectangular openings in the bottom of this cover, and extending lengthwise of the treadle, to within a short distance from the edges of this section, leaving some width of cover bonded to the base plate 18 to maintain the bonded seal. These plates are substantially rigid in themselves and the cover 17 is sufficiently flexible so as to permit these plates to be depressed individually by a wheel rolling over any part of their length. It will be appreciated that an automobile tire has several inches of width of contact with the roadway and the cover 17 is sufficiently flexible for these plates 27, 28 and 29 to be depressed individually in each of two adjacent sections LTS and NTS for example if a single wheel rolls along the line 11—11 between sections so that the tire extends to any substantial extent over a part of each of the adjacent sections NTS and LTS. These plates are restored to their normal position as shown in Fig. 2 by the resilience of the cover 17, it being noted that a small part of the material of the cover or other suitable insulation material extends under the long edges of these plates.

Vertical plunger pins 32, 33 and 34 extend through holes in the plate 18 under the plates 27, 28 and 29 respectively and near the middle of these plates so as to be depressed by the depression of the associated plate by a vehicle wheel. These pins 32, 33, and 34 are associated with switches preferably in watertight enclosures attached to the lower side of plate 18 so as to operate the respective switches by depression of the respective pins. These switches may be of the "Micro-switch" type for example.

It will be appreciated that depression of one of the plates 27, 28 and 29 by a wheel near one end of the plate will ordinarily depress that one end more than the other end with some tilting of the plate, but that in any case the middle of the plate will be depressed sufficiently to actuate the switch thereunder if nearly half or more of one of the narrower tires in general use for example extends on to the section from the section edge 11—11, or if a substantial part of a larger tire extends beyond the edge, in rolling along this edge as well as when a wheel rolls over the middle part of the section with the entire width of the tire on the section. The group of switches 35, 36, 37, and 38 are operated as a unit by rectangular bar 39 attached to the lower end of the pin 32. The pin 32 and the corresponding hole in the plate 18 are square or otherwise out of round to prevent bar 39 from turning. This bar 39 depresses the several pins 42 extending from the top of the switches 35, 36, 37 and 38. The switch 40 is operated only by the pin 33 by depression of plate 28 and the switch 31 is operated only by the pin 34 by depression of the plate 29, these switches being mounted under these respective pins. The switches 35, 36, and 37 and 38 are spaced from the lower side of the plate 18 by the spacers 43 and 44 to provide room for the bar 39 and operating pins 42, these switches being attached to the bottom of the plate 18 by means of the screws 45 and 46.

Switches 35, 36, 37 and 38, serve as the classification group of treadle switches for the section, and switches 40 and 41 serve as the directional switches. The switches 35, 36, 37 and 38 include two single pole double throw or make-break switches, one single pole normally open or make contact switch and three normally closed or break contact switches and the switches 40 and 41 may be single pole make contact switches in this form of treadle.

The wires from switches 35 through 38 are fed through a tube 48 attached to the bottom of the plate 18 by the brackets 49 and 52.

The wires 53 and 54 from switches 40 and 41 respectively also extend into the protective tube 48.

A downward extension 55 from tube 48 is provided with a waterproof type connecting plug assembly 56, 57, 58 for connection of the wires from all the switches of this section to the multi-conductor flexible cable 59 providing connections to the corresponding switches of the other sections of the treadle, through a raceway 62 extending through the several sections along the length of the treadle, the interconnecting cable appearing at 63 in the raceway.

The cables 59 in the several sections would preferably be wired to the interconnecting cable 63 in the raceway as a sealed unit by the manufacturer of the treadle unit, and the section units would normally be delivered attached to the casing 12 with the section unit wiring connected to the cable 59 in each section at the plug and jack assembly 56—57—58. However for field maintenance of the treadle any section unit may be removed readily by removing the bolts 22, lifting the section unit up and disconnecting the wiring by loosening the lock nut 58 and separating the plug and jack assembly 56—57, the flexible cable 59 providing sufficient slack for this purpose. A new section unit having its own assembly of switches and wiring may then be readily connected, lowered into position and bolted into place.

All of the joints of the section unit and casing assembly are preferably gasketed to prevent entrance of water but any slight seepage or condensation may be carried off by the drainage channel 64 to a dry well for example if desired.

Referring now to Figs. 4 and 5 these figures show top and transverse vertical section views of another form of treadle section unit which may be employed in accordance with the invention. This section unit of Fig. 5 has a top cover 71 of rubber or other suitable flexible insulating material and bonded to a base plate 72 and this section unit is bolted to the casing as in Figs. 1, 2 and 3 except that the section unit is shown without any bolts at the sides and without any lift ring for illustration of a simplified construction which may be found satisfactory for many applications of the invention.

In the section construction of Figs. 4 and 5 the three contact plates 73, 74, and 75 are embedded in the cover 71 and separated by the spacers at their right and left edges from the bottom plate 72. These spacers may be of rubberized fabric or other material for support of the edges of these contact plates but to permit them to flex at their middle to contact the lower plate 72 under the pressure of a wheel rolling over them. The top of the cover 71 may be substantially flat as shown in Fig. 2, or may be formed with ridges 76 over the contact plates as shown in Figs. 4 and 5 to increase the sensitivity of response of the unit to traffic actuations if desired.

Figure 6:
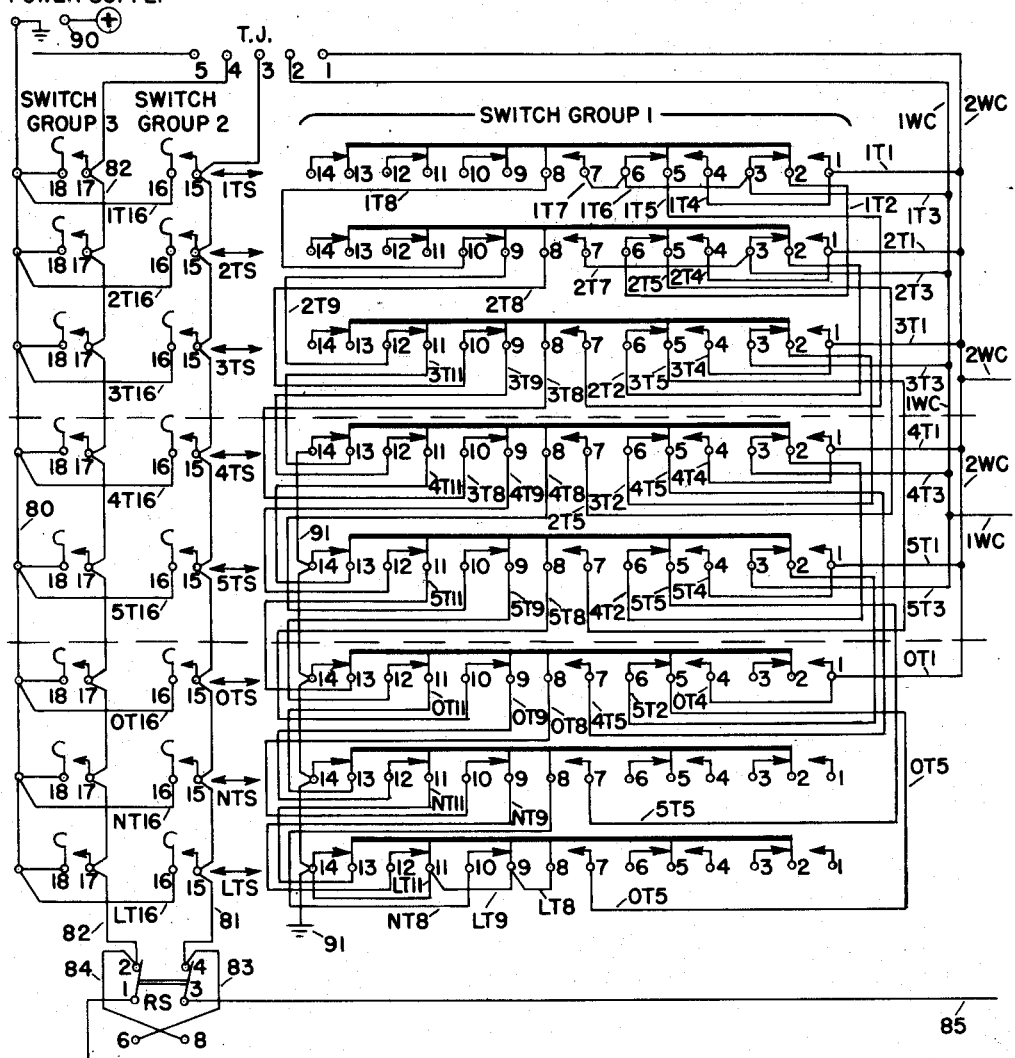
Figs. 6 shows a schematic diagram of one form of circuit for the treadle switches or treadle operated contacts of several adjacent sections of a sectionalized treadle.

When this Fig. 4-5 construction is employed in place of the Fig. 1-3 construction for the section unit, the lower plate 72 serves as the common grounded side of the switches and is connected to ground wire 80 of Fig. 6, the switches 75—72 and 74—72 take the place of the switches 41 and 40 respectively, the plates 75 and 74 being connected to wires 82 and 81 respectively, and the switch 73—72 serves when actuated to connect ground to one side of a relay coil, this one side of this coil being connected to plate 73 and the other side of this coil being connected to positive power, this coil thus being energized by traffic actuation of the switch 73—72 to operate all the contacts TS1 to TS14 as relay contacts. See Fig. 11 for an illustration of this arrangement, the treadle contacts 1a—2a of Fig. 11 serving to illustrate the switch contacts 72—73, for example. Thus this single switch 73—72 and the relay coil and contact arrangement would take the place of the switches 35, 36, 37, 38, but for either construction the contacts TS1 to TS14 and the circuits through these contacts are the same as shown in Fig. 6 whether these contacts are switch contacts in the treadle itself or the switching contacts of a relay operated by a single switch 73—72 or by a single contact switch such as 40 and 41.

Reference will now be made to the schematic circuit diagram of Figs. 6 through 9. The treadle in accordance with the invention preferably contains three main groups of switches as indicated by TS switch group 1, group 2 and group 3, in Fig. 6. The first group in the normal direction of traffic, group 1, may be termed the classification group of switches and it is these switches which are preferably interconnected between sections to distinguish between single and dual wheels. The sections are closely spaced and about as wide as the average tire tread on the road in order that a single wheel will not actuate more than two sections simultaneously, if for example the single wheel overlaps adjacent sections, but dual wheels will normally actuate non-adjacent sections, that is sections separated by at least one intervening section, whether or not they actuate such intervening section. For example if a group of adjacent sections is considered numbered 1TS, 2TS, 3TS and 4TS, then a single wheel may actuate any one of these sections or may actuate adjacent sections such as 1TS and 2TS or 2TS and 3TS but will not normally actuate sections 1TS, 2TS and 3TS at the same time. On the other hand a dual wheel will normally actuate sections 1TS, 2TS, and 3TS or sections 1TS and 3TS or sections 2TS, 3TS, and 4TS or sections 2TS and 4TS, or possibly sections 1TS, 2TS, 3TS and 4TS or sections 1TS and 4TS or sections 1TS, 2TS and 4TS or sections 1TS, 3TS and 4TS.

In addition to this classification group of switches there are two other groups of switches, group 2 and group 3 in Fig. 6, preferably arranged to follow, in the direction of normal travel, the classification group, these additional groups being provided, with associated relays, to perform two functions: first, the determination of the direction of travel of the vehicle wheel over the treadle in forward and reverse directions, and second, to prevent the counting impulse from actuating the counting circuit until the wheels have fully cleared the directional treadle contacts and these contacts are restored to normal. The second group of switches may be either a single long set of contact plates extending along the length of the treadle transverse to the direction of travel, or may for maintenance purposes or convenience of construction be sectionalized into a series of switches connected in parallel in sections corresponding to the sections of the classification group of switches. The third group of switches in the direction of travel can similarly be arranged either as a single long plate switch or as a sectionalized series of switches connected in parallel.

The several groups of switches are preferably arranged close enough together in the direction of travel of traffic so that wheels of vehicles will actuate the switches of the successive groups in overlapping sequence. For example, a wheel rolling in the normal direction of travel will actuate first the classification group alone, then the classification group with the second group, then the second group alone, then the second group with the third group and then the third group alone, in proceeding over the several groups. However the system will still operate correctly if the wheel operates the groups of switches with a more extended overlap covering concurrent actuation of all three groups in the middle of the sequence. The operation of the three treadle switch groups in any sequence other than the designed sequence, as, for example, might be caused by a person walking over the treadle, will not cause a vehicle registration as explained below.

The three groups of switches together may be termed a sectionalized treadle assembly, and this assembly is connected to several groups of traffic counters to provide for registration of the counting actuations, through relay circuits designed to discriminate as to the direction of travel of the vehicle wheels and as to the single or dual arrangement of wheels on the axles of the vehicle and also as to the sequence of such wheel groups. In the preferred form of the invention the counter relay circuit can be considered in four main circuits, (1) the directional relay circuit, (2) the single and dual wheel classification circuit, (3) the single wheel roll back and counting circuit and (4) the dual wheel roll back and counting circuit. In general circuits (1) and (2) appear in the lower and upper parts of Fig. 7 respectively, circuit (3) appears in Fig. 8 and circuit (4) in Fig. 9.

As indicated by the roll-back designation in the third and fourth relay circuit groups above, the apparatus is designed to take into consideration the roll-back or reverse actuation of the sectionalized treadle assembly by vehicle wheels, and in the preferred form of the invention such roll-back actuations are stored or accumulated against forward actuations up to a limit of two axles in the single wheel counting circuit and up to a limit of three axles in the dual wheel counting circuit by means of chain relay circuits so as to require stored roll-back actuations to be cleared by subsequent forward actuations in the single wheel counting circuit and to provide for clearing of stored forward actuations by subsequent roll-back actuations in the dual wheel counting circuit, so that a net forward count is provided. Reverse actuations above two in number in the single wheel roll-back and counting circuit are discarded in the sense that no account is taken of successive single wheel roll-back actuations exceeding two. In the dual wheel roll-back and counting circuit, however, all reverse actuations not compensated for by previous forward dual wheel axle actuations, are counted and recorded by a counter JA.

Figure 8:
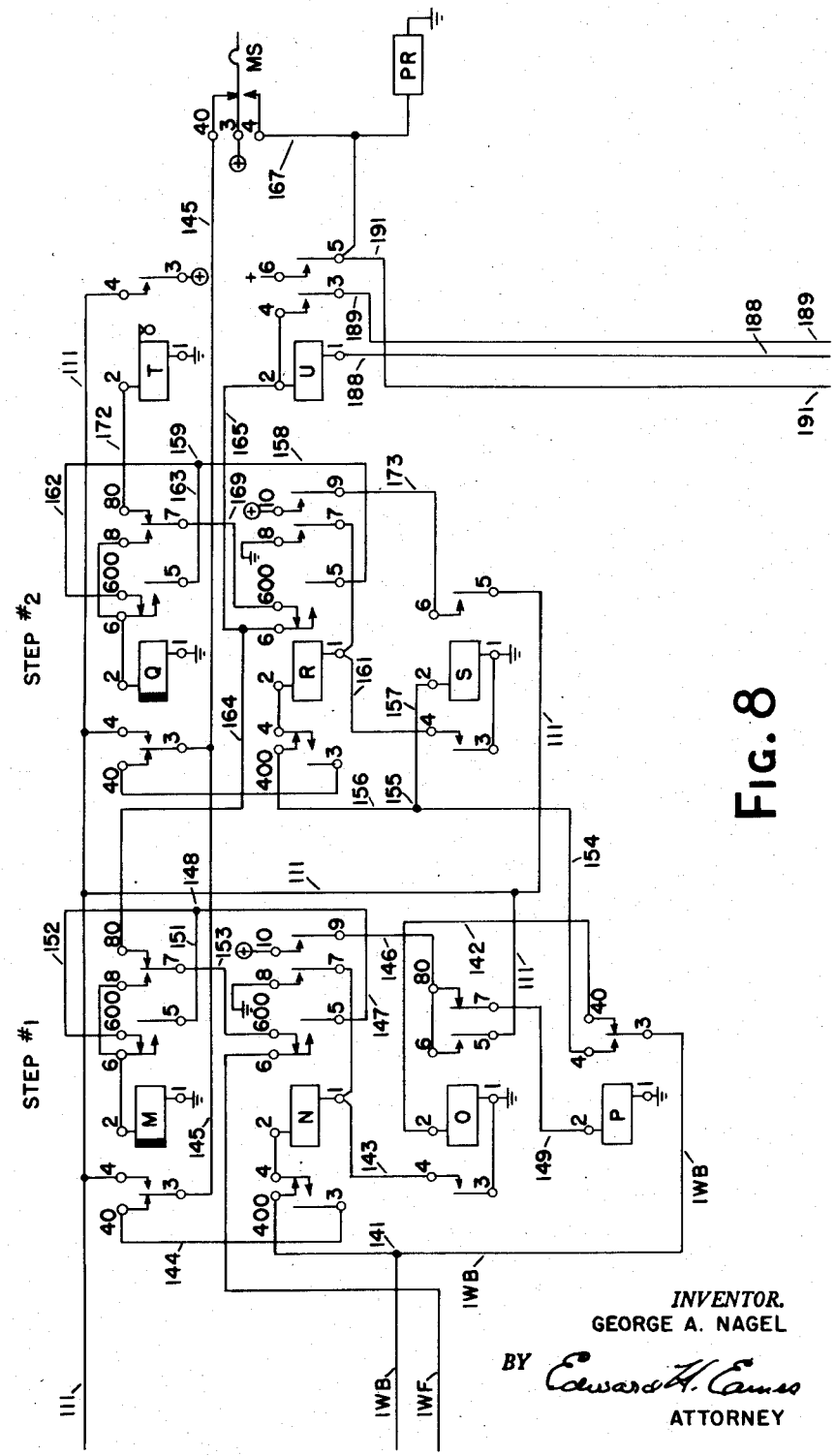
Fig. 8 shows a schematic diagram of another part of the relay circuit including the single wheel roll-back and counting group.
Figure 9:
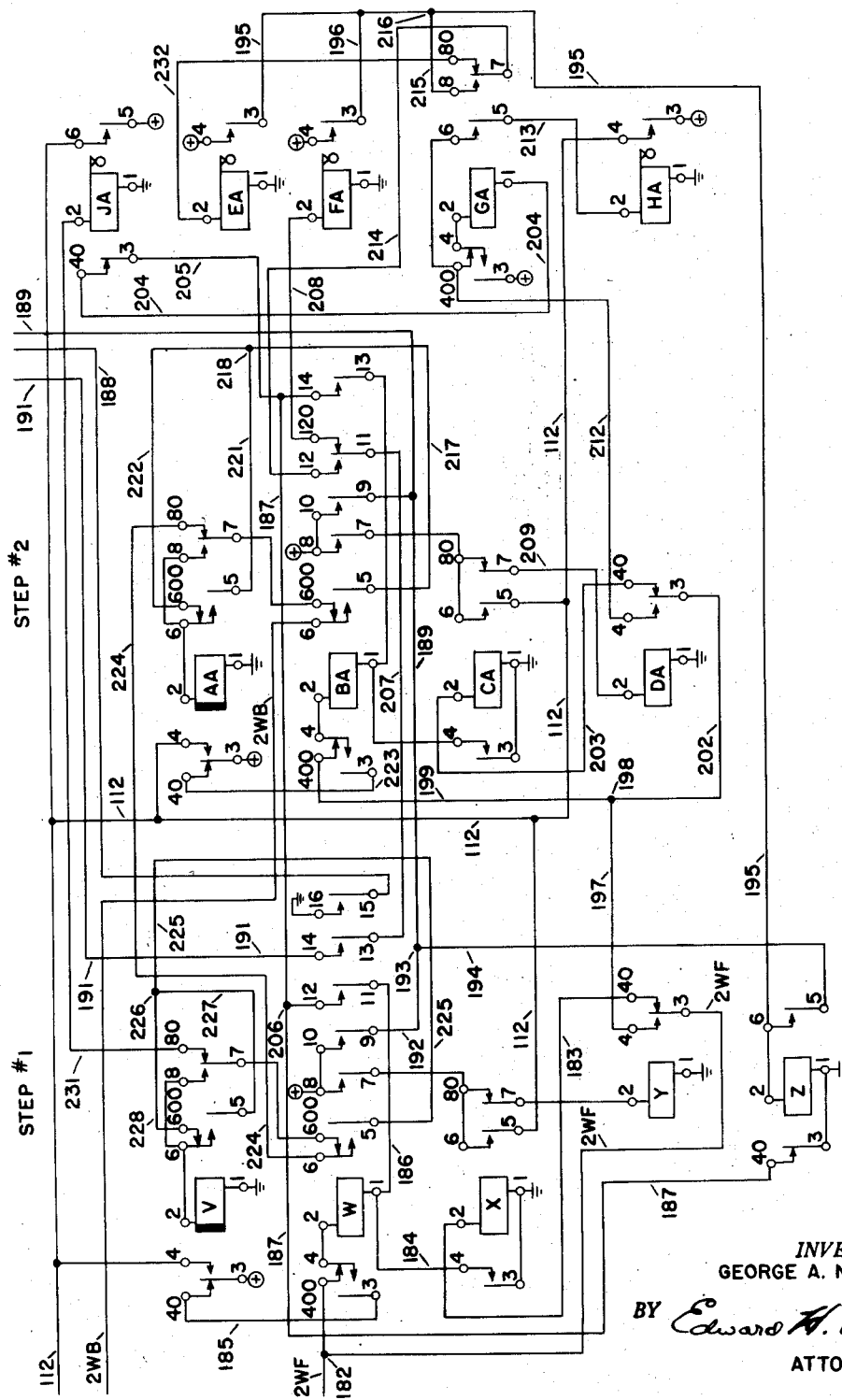
Fig. 9 shows a schematic diagram of another part of the relay circuit including the dual wheel roll-back and counting group.

In the present embodiment of the invention the sequence of axles of single and dual wheels, representing typical classifications of vehicles such as passenger cars and different types of trucks, is taken into account and separate counters are provided for different types of axles and for different types of vehicles having one, two or more than two successive dual wheel axles, as follows. Thus a counter T in Fig. 8 is provided for single wheel axles, another counter FA in Fig. 9 is provided for trucks having a single wheel axle followed by a dual wheel axle, a counter EA in Fig. 9 is provided for a truck having a single wheel axle followed by two dual wheel axles in succession, and a counter HA in Fig. 9 is provided for a truck having a single wheel axle followed by more than two dual wheel axles in succession. Counters are distinguished from relays in the circuit diagram by a small triangle and circle at the end of the coil to indicate schematically a counter ratchet and pawl.

Chain relay circuits are connected to these several counters so that when a single wheel axle actuation is followed by a dual wheel axle actuation a part of the chain relay circuit for dual wheels is set up. Then if another dual wheel axle follows before a single wheel axle a second step in the chain relay circuit for dual wheels is set up. Similarly if a third dual wheel axle follows before a single wheel axle a third step in the chain is set up. In any case as soon as the next single wheel actuation occurs it actuates the appropriate counter as determined by the previously set up chain circuits and the actuation of such counter clears the chain circuits. Thus the first single wheel axle actuation following any immediately previous dual wheel actuations actuates the counters and causes a count of the previously set up dual wheel axle classification corresponding to the dual wheel axle or axles of the vehicle next preceding such first single wheel axle actuation, registering a count of a single wheel axle and an individual dual wheel axle or a pair of dual wheel axles or a group of three or more dual wheel axles. However if a succession of single wheel actuations occurs without any dual wheel actuations each single wheel axle is counted and the circuit cleared by actuation of the counter. The previous discussion applies to counts of vehicles proceeding in the normal direction of traffic. Any actuation by a wheel rolling back in the opposite direction or reverse direction releases a previously set up chain relay circuit step or sets up a chain relay circuit step in the dual wheel roll back group or the single wheel roll back group respectively in accordance with whether the roll back actuation is by a single wheel axle or a dual wheel axle. Successive single wheel roll back actuations up to the limit of the number of steps provided in the single wheel chain relay circuit for example, will be stored by the set up of successive steps in the chain relay circuit and the next forward single wheel traffic actuations will successively clear those steps before actuation of the counter. Successive dual wheel forward actuations set up successive steps in the dual wheel chain relay circuit up to its limit and successive dual wheel roll-back actuations release successive steps previously set up by forward actuations.

Thus with this roll back protection feature the traffic counting apparatus according to the invention will provide, within the ordinary limits of the normal traffic checking or counting or toll collection conditions, for a net forward count by single wheel and dual wheel classification groups. It will be appreciated that additional steps in the chain relay circuits for roll back or forward actuations may be provided if desired along the lines of the chain relay circuits disclosed herein to store additional actuations beyond the limit of such actuations provided for in present circuits of the invention.

Figure 7:
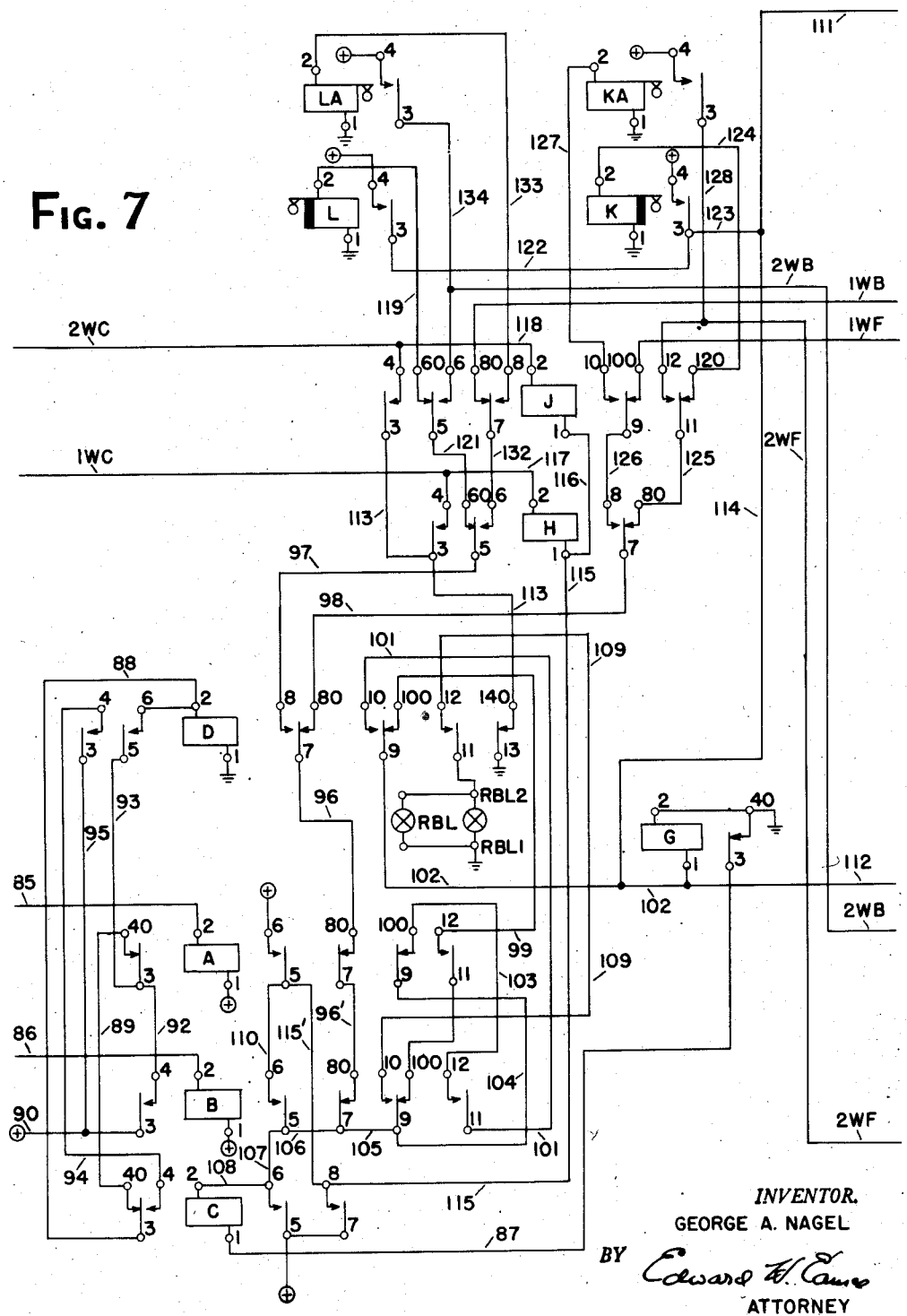
Fig. 7 shows a schematic diagram of a part of a relay circuit for operation with the sectionalized treadle circuit of Fig. 6, including a directional relay group and a dual and single wheel classification relay group.

Considering now the schematic circuit diagram shown in Figs. 6, 7, 8 and 9 of the drawings these several figures should be arranged with Fig. 6 to the left, Fig. 7 to the right of Fig. 6 and Figs. 8 and 9 both to the right of Fig. 7 with Fig. 8 above Fig. 9 and with the few interconnecting wires at the edges of the figures, with this arrangement the sectionalized treadle assembly is shown at the left in Fig. 6, and to the right of the lower part of that is shown the directional relay group in the lower part of Fig. 7. To the right of the sectionalized treadle assembly of Fig. 6 is the vehicle classification group in the upper part of Fig. 7 and further to the right is the single wheel roll back and counting circuit group in Fig. 8. Below the latter is the dual wheel roll back and counting circuit group in Fig. 9.

Considering now the sectionalized treadle assembly in Fig. 6 the classification switch group for each section includes two make-break switches or contact groups and one make switch or contact group and three break switches or contact groups. The starting and terminating sections at the ends of the treadle may omit certain of the contacts as will appear below but for purposes of standardization may normally be made the same as the other sections. The several classification switches in each section may be installed in the treadle section itself in four multiple switch units 35, 36, 37, and 38 or may be subdivided into further switch units operated simultaneously by the bar 39, or a single make contact switch for example may be employed in the treadle section itself and may be connected to the coil of a relay which would provide the several make and break contact assemblies which would be operated by actuation of the relay by the single treadle switch in the same section as if the make and break switches were actually installed in the treadle to be directly actuated by the vehicle wheel.

In general the switches in the several sections are connected in a number of series circuits extending through the switches in several adjacent sections. These series circuits are connected in general in parallel to one or the other of two main output circuits 2WC and 1WC, the first for dual wheel actuation and the other for single wheel actuation, these output circuits being connected to one side J2 and H2 of the operating coils of relay J and relay H respectively. The dual output circuit 2WC is connected to the several parallel circuits through combination of make and break switch contacts in adjacent and spaced sections as will be described in more detail below. Correspondingly the single wheel output circuit 1WC has connected to it several parallel circuits to other combinations of make and break contacts in adjacent and spaced sections as will be more fully described below.

In the second and third group of switches provided for directional sequence actuation in the treadle assembly in Fig. 6, if these switches are provided as individual switches in each section all of the switches numbered 15—16 and referred to as 1TS15—16, 2TS15—16 etc. of group two as shown in Fig. 6 for example will be connected in parallel from the grounded side of the power supply on wire 80 in Fig. 6 via wires 81 and 85 through the coil of relay A in Fig. 7 to the other or power side of the power line at A1 designated by a plus sign. If the second group of switches is combined into one long set of contact plates serving as one switch this one switch is connected between wires 80 and 81 in the circuit from the grounded side 80 of the power line and through relay A to the positive power side at A1, as represented by any one of the switches in group 2.

Similarly individual switches 17—18, when provided for each section in the third group of switches as 1TS17—18, 2TS17—18 etc., are connected in parallel between the ground side 80 of the power line in Fig. 6 via wires 82 and 86 to one side B2 of the coil of relay B in Fig. 7, the other side of the coil being connected to positive power at B1. However, if a long single set of contacts is provided as one switch such contacts will be connected between wires 80 and 82 as represented by any one of the switches of group 3 in the same circuit from ground through the coil of relay B to positive power. In each case these switches of the second and third groups are preferably of the make contact type closing the circuit upon actuation, for convenience of construction and circuit arrangement.

The relays A and B referred to are in the directional relay circuit group shown to the right of the treadle switches in the lower part of Fig. 7 and this directional relay circuit group also includes the additional relays C and D. The relay C is connected to have its coil energized by a circuit from positive power through make contacts A6—A5 and B6—B5 associated with the A and B relays to C6 and C2 through the coil of C to C1 and via wire 87 and break contacts G3—40 to ground to initially energize relay C upon concurrent actuation of the second and third groups of switches and consequent concurrent energization of relays A and B. Relay C is provided with a lock in contact C5—6 to maintain positive power on one side C2 of its coil after initial application of positive power by concurrent operation of relays A and B as pointed out above, to control the holding in of relay C by relay G.

The other relay D of the directional relay group has its coil at D2 connected to be energized via wire 88, via a break contact C3—40 on relay C, wire 89, and a break contact A3—40 on Relay A, wire 92, and a make contact B3—4 on relay B to positive power wire 90 so as to energize initially relay D upon initial actuation of relay B before relay A corresponding to actuation of the third group of switches in the treadle prior to actuation of the second group. This sequence of actuation would correspond to movement of a wheel in the reverse or roll back direction. The other side D1 of the coil of relay D is connected to ground. Relay D is provided with a lock in contact D5—6 serving to maintain positive power applied to the one side D2 of its coil after initial energization. These lock in contacts are make contacts D6—5 connected between the positive side D2 of the coil of relay D and via wire 93 to a point A3 between the break contact A3—40 of relay A and the make contact B3—4 of relay B on the initial energizing circuit previously described for relay D. Thus these locking contacts D5—6 serve to shunt the break contact C3—40 of relay C and the break contact A3—40 of relay A in the initial energizing circuit of relay D so as to maintain relay D energized over the make contact B3—4 of the relay B alone after initial energization.

A holding circuit to maintain relay D energized is also provided from the positive side D2 of the coil D via wire 88 and make contact C3—4 of relay C and via wire 94 and an additional make contact D3—4 on relay D via wire 95 to positive power wire 90 so as to maintain relay D energized with relay C independently of the conditions of relay A and B after relays C and D have once been initially energized concurrently and until relay C is deenergized.

Because of the initial energization circuit of relay D in relation to relays A, B and C, relay D will become energized only by a roll-back actuation and will thereupon remain energized over its holding circuit via contact C3—4 of relay C previously described until such energization has served its purpose as described below. Thus relay D serves as an indicator of normal forward or roll-back actuation respectively in accordance with its condition of deenergization or energization. Additional contacts are provided on relay D to control the circuits in the vehicle classification and counting groups therefore in accordance with forward or roll-back actuations respectively. The first of these contacts has a common moving armature contact D7 connected via wire 96 and break contacts A7—80 and B7—80 on relays on A and B in series to the positive side C2 of the coil of relay C. A make contact D8 associated with this moving armature D7 of relay D is connected to a main roll-back control and counting circuit via wire 97 to armature H5 of relay H to provide roll-back storage and counting power to the remainder of the relay circuit. Similarly a break contact D80, associated with the common moving armature D7 of relay D, provides the connection to a main control and counting circuit via wire 98 to armature H7 of relay H for the remainder of the relay circuit for providing power for such circuit from forward actuation.

The next adjacent make-break contact D9—10—100 on relay D is connected via wires 99 and 101 through make break contacts of relays A and B to supply positive power via wire 102 to the positive side G1 of the release relay G under certain conditions which will be described below. The positive side G1 of the coil of relay G at wire 102 is connected to the common moving armature D9 on relay D which has associated a break contact D100 connected in a series circuit via wire 99 through a make contact A11—12 on relay A and a break contact B9—100 on relay B to the positive side C2 of the coil on relay C. A make contact D10 is associated with the moving armature D9 of relay D and is connected in series with a circuit via wire 101, a make contact B11—12 of relay B, wire 103 and a break contact A9—100 on relay A via wires 104, 105, 106, 107, 108 to the positive side C2 of the coil of relay C.

Another make contact D11—12 on relay D is connected in series from the positive side RLB2 of the roll-back indicator lamps RLB via wire 109, a make contact B9—10 on relay B associated with a moving armature B9 of relay B connected via wires 105—108 with the positive side C2 of the coil of the relay C, the latter receiving positive power over make contacts C5—6, and the other side RBL1 of the lamps RBL is connected to ground so that the lamps RBL will be illuminated upon concurrent energization of relay D and relays B and C. An additional break contact D13—140 on relay D is provided to supply current over a holding circuit via wire 113 for lock in contacts H3—4 and J3—4 on relay H and J respectively after initial energization of these relays over the main single wheel circuit 1WC from the treadle switches or main dual wheel circuit 2WC from the treadle switches respectively.

An additional make contact C7—8 is provided on relay C with one side C7 connected to positive power and the other side C8 connected through two branch circuits. The first branch circuit is via the make contact A5—6 on relay A to positive power and the second branch circuit is connected to the lower side 1 of the coil of both of the relays H and J to supply power for operation of these relays when the upper side 2 of the coils of one or the other of these relays is connected to ground via the main single wheel circuit 1WC or the main dual wheel circuit 2WC respectively from the treadle switches.

Considering now the sequence of operation of the relays of the directional relay group for forward and roll-back actuation this operation is as follows:

*In case of a forward actuation (considering the directional switch groups 2 and 3 only).*—As a wheel rolls first over the second switch group of the treadle, relay A is energized alone, then as the wheel rolls further the third switch group is actuated concurrently with the second group, and the relays B and C are energized concurrently such energization of relays A and B causing energization of relay C. Then as the wheel rolls further forward to actuate the third switch group alone relay A becomes deenergized leaving relays B and C energized, and then as the wheel rolls further forward relay B becomes deenergized leaving relay C energized over its own lock-in contact C5—6 and via the contacts G3—40 of the release relay G. Therefore as a result of normal forward actuation the relay C remains energized until the next actuation of one of the counters or chain relay circuits to energize one of the wires 111, 112 or 114 for example to energize the release relay G to release the relay C. Also it will be noted that as a result of this forward actuation the relay D remains deenergized thus indicating a forward actuation in relation to the energization of relay C, the combination of relay C being energized and relay D being deenergized providing energization for the main forward actuation power circuit 98 to the remainder of the relay circuit from the positive side of the power supply over the make contact of relay C, and the break contacts of relays B, A and D.

*In case of a reverse actuation (considering the directional switch groups 2 and 3 only).*—Upon actuation of the third switch group first, relay B will be energized alone which will inturn energize relay D with relay B, then as the second switch group is actuated concurrently with the third group as the wheel continues to roll back, relay A becomes energized which in turn energizes relay C, thus leaving at this step relays A, B, C, and D energized. Then as the second group alone is energized after the wheel rolls further back leaving the third switch group, the relay A remains energized, the relay B becomes deenergized and the relays C and D remain energized. As the wheel continues to roll back and off of the second switch group, relay A will become deenergized leaving only relays C and D energized, relay C being locked in energized over its own make contact C5—6 and the break contact G3—40 of the relay G, and relay D being locked in and held energized over its own make contact D3—4 and the make contact C3—4 of relay C previously described. Thus this combination of relay C and D remaining energized continues until the relay G is actuated which would normally be by energization from actuation of one or another of the counter or chain relay circuits as mentioned above in accordance with the combination of the classification switches in the classification switch group as actuated by the wheel rolling further back.

If the wheel does not roll further back but reverses at this stage and rolls forward again a forward count will be registered when the wheel has rolled over and cleared the directional contacts in a forward direction of travel. If the wheel reversed its direction before leaving the second group and continued in the forward direction, the relay B would be reenergized and then relay A would be deenergized, which would actuate relay G as follows. With relay D energized in the condition of roll-back which we have assumed at the moment, the lower or positive power side G1 of the coil of relay G is connected via wire 102, a make contact D9—10 of relay D, wire 101, a make contact B11—12 on relay B wire 103, a break contact A9—100 on relay A wires 104, 105, 106, 107, 108 to positive side C2 of the coil on relay C which is supplied with positive power over its make contact C5—6; thus when the wheel, which has rolled back on to the second group of directional switches with or without classification switch actuation (without having left the second group of directional switches and thus without having caused the deenergization of relay A) then rolls forward over the directional switches so as to energize the relays A and B concurrently again and then relay B alone, the condition where B is energized alone will close the circuit just traced for energization of the release relay G to interrupt the holding circuit for relay C and thus release relay C to restore relays C, D, and G to normal deenergized condition and thus leave relay B in energized condition to initiate a reverse count actuation if the wheel reversed itself again or to restore relay B also to normal deenergized condition if the wheel continues forward and rolls off the treadle.

Considering now the vehicle classification relay group H and J and the counters K and L it has been previously described how relay H is energized by the combination of relay A being energized and a single wheel actuation of the treadle circuit IWC, and how relay J becomes energized by the combination of relay A being energized and actuation of the dual wheel circuit 2WC from the treadle switches. Ordinarily at any one time as a result of actuation by any one axle either the single wheel circuit IWC or the dual wheel circuit 2WC will be actuated and thus either relay H or relay J will be energized in connection with relay A, positive power being supplied over the make contact C7—8 of relay C via wires 115 and 116 to hold relay H or relay J operated upon release of relay A. However, the circuits to the counters through the contacts of relays H and J are designed so that concurrent actuation of both main treadle circuits IWC and 2WC will be treated as a dual wheel actuation as by actuation of circuit 2WC alone, except that counters KA and LA are provided to count the occurrences of such concurrent actuation of circuits IWC and 2WC in the forward and reverse directions respectively, as will be more fully described below. Thus although the main treadle circuits IWC and 2WC may be referred to as single wheel and dual wheel circuits respectively and may be considered primarily as such, these circuits need not completely distinguish inherently between single and dual wheel actuations in the sense that dual wheels may for example in some cases actuate both circuits and thus operate both relays J and H and through the contacts of relays J and H the dual wheel circuit actuation will take precedence and will be channeled via further dual wheel circuits to the dual wheel relay chain for counting purposes, the single wheel counting and roll-back circuit being unaffected by such concurrent actuation of circuits IWC and 2WC.

Upon initial energization of relay H by actuation of treadle circuit IWC and concurrent energization of relay A, if the actuation is in the forward direction relay H locks in over its make contact H3—4 and wire 113, and the break contact D13—140 of relay D and remains locked in as long as it obtains power from energization of relay A or relay C, but if the actuation is in the reverse direction relay H remains energized on continued roll-back only by continued actuation of switch group I and continued energization of relay C or relay A since contact D13—140 is open.

When relay J is initially energized by actuation of treadle circuit 2WC and concurrent energization of relay A, if this is a forward actuation relay J locks in over its make contact J3—4, wire 113 and break contact D13—140 of relay D and remains energized so long as energization of relay A or relay C continues, but if this is a roll-back actuation relay J remains energized on continued roll-back only by continued actuation of switch group I and continued energization of relay C or relay A since contact D13—140 is open.

Whichever of relays H or U is energized will normally be deenergized again by release of relay C by energization of relay G by operation of one of the counters or chain relay circuits by continued rolling of the wheel off of the directional treadle switch groups, as described more fully below.

The counter L is provided with one side L1 of its coil connected to ground and the other side L—2 of its coil is connected via wire 119 and break contact J5—60 on relay J in series with wire 121 and a break contact H5—60 in series via wires 97, 96, 96', 106, 107 and make contact C5—6 of relay C to positive power, so as to energize the counter L in event of energization and subsequent deenergization of the directional relays by roll-back actuation without actuation of the classification relays J and H. Counter L also serves as a relay operating its make contact L3—4, and energization of the counter L connects positive power via its make contact L3—4 and wires 122, 123, 114, 102 to the positive side G1 of the coil of the release relay G to energize the latter and thereby release the relay C and relay D.

Similarly counter K of the vehicle classification group is energized by positive power supplied to the upper side K2 of its coil via wire 124, a break contact J11—120 on relay J and wire 125 and break contact H7—80 on relay H and wire 98 a break contact D7—80 on relay D, and break contacts A7—80 and B7—80 on relays A and B in series and via wires 106 and 107 to the positive power supply at make contact C5—6 on relay C, the other side K1 of the coil of counter K being connected to ground. Thus counter K is energized in the event of forward actuation of the directional switches and relays without actuation of the classification relay group. Upon energization of counter K its make contact K3—4 connects positive power via wires 123, 114 and 102 to the positive side G1 of release relay G to actuate the latter and cause the release of relay G as previously described.

Thus it will be noted that power is supplied for counting after the classification circuits have had opportunity for full actuation by the rolling wheel or wheels, and the relays H and J reach their appropriate condition of operation or non-operation, since the counting power over the circuits described extends over wires 97 and 98 to the contacts of relays H and J only after actuation of the directional treadle switches of groups 2 and 3 in overlapping sequence and release of both of these groups of switches, i. e. when the wheel has rolled over and off these groups of switches.

In normal forward actuation of the directional switches and classification switches in the overlapping sequence described additional contacts of relays H and J will extend power from the main forward or reverse actuation circuits 98 and 97 to the appropriate single wheel roll-back and counting circuit group in Fig. 8 or dual wheel roll-back and counting circuit group in Fig. 9 in accordance with single or dual wheel actuation. The contacts of relays H and J providing this feature are as follows. The main forward actuation power circuit 98 from the break contact D7—80 of relay D is connected through the break contact H7—80 of relay H in series via wire 125 with a make contact 11—12 of relay J, when relay J is energized and relay H is deenergized, and via the dual wheel forward actuation circuit 2WF to the dual wheel roll back and counting circuit in Fig. 9 connected at the lower right part of Fig. 7 as will be more fully described below. This main forward actuation power circuit 98 from the break contact D7—80 of relay D is also connected (when relays H and J are energized) via a make contact H7—8 of relay H in series via wire 126 with a make contact J9—10 on relay J and wire 127 to one side KA2 of the coil of counter KA, the other side KA1 of this counter coil being connected to ground. This energizes counter KA to extend positive power over make contact KA3—4 and wire 128 as just described for the dual wheel roll back and counting circuit. Thus as far as actuation over this circuit is concerned connection to the dual wheel counting and roll back circuit of Fig. 9 is completed by energization of relay J by dual wheel actuation whether or not the relay H has been energized concurrently by single wheel actuation, but counter KA is actuated to record the cases of joint dual wheel and single wheel forward actuation.

The main forward actuation power circuit 98 from the break contact D7—80 of relay D also is connected via the make contact H7—8 of relay H via wire 126 in series with the break contact J9—100 of relay J to extend the actuation power over the single wheel forward actuation circuit 1WF to the single wheel roll-back and counting circuit in Fig. 8 connected to the upper right part of Fig. 7. Similar circuits to the above are provided for the main reverse power circuits originating at the make contact D7—8, and proceeding thru a make-break set of contacts on relay H which contacts are in series with two sets of make-break contacts in relay J, the break contact of one of the latter connecting to the single wheel roll-back and counting circuit, while the two make contacts in the group are connected to the dual wheel roll-back and counting circuit directly or via operation of the counter LA respectively. The operation is similar to that described under the main forward power counting circuit.

*Operation of roll-back and counting circuit in case of single wheel forward actuation.*—Considering now the single wheel roll-back and counting circuit (Fig. 8) and assuming that a single wheel forward actuation has occurred, such actuation will have energized and locked up relay H and relay C. Relays D and J will remain deenergized and thus power will be supplied from the make contact C5—6 of relay C via break contacts on relays B and A and break contact D7—80 on relay D over circuit 98 and thence via a make contact on relay H and a break contact on relay J over the single wheel actuating circuit 1WF to the single wheel roll-back and counting circuit in Fig. 8 at a make before break contact N6—600 on relay N. Assuming that there have been no roll-backs and therefore all of the relays of the single wheel roll-back and counting circuit are deenergized as will be explained later, this power on wire 1WF for the counting circuit is extended through the make before break contact N6—600 of relay N and via a break contact M7—80 on relay M to a make before break contact R6—600 on relay R. At this point the circuit proceeds in two branches, the first to the positive side of relay U, the operation of which will be explained later, the second branch proceeding thru the make before break contact on relay R and a break contact Q7—80 on relay Q to the positive side T2 of the forward single wheel axle counter T the other side T1 of this counter being connected to ground. Thus a forward single wheel axle count will be made and by a make contact T3—4 on this counter T a positive power will be connected over wire #111 to the positive side G1 of the coil of the release relay G to release the relays C and H and reset the relay circuits to normal.

Assuming now that another single wheel forward actuation occurs after the single wheel forward actuation just described, this additional single wheel forward actuation will again energize and lock up relay H and relay C and will again energize the single wheel axle counter T to advance this counter one additional digit and at the same time to close its make contacts T3—4 to energize the release relay G to release the other relays and restore the circuit to normal condition.

Similarly a succession of single wheel axle forward acutations will each advance the counter T one count and in each case will reset the circuits to normal, and if there have been no intervening dual wheel axle actuations the dual wheel circuit group in Fig. 9 will not be affected.

*Operation of roll-back and counting circuit in case of single wheel roll-back actuation.*—Continuing with consideration of the operation of the single wheel roll-back and counting circuit it will now be assumed that after a series of forward single wheel actuations for example we now have a case of a roll-back actuation by a single wheel. This may occur for example if a vehicle traveling in the normal forward direction overruns the treadle by one axle at least and then stops and reverses to go back a short distance to the toll collector's booth at a toll station. As the wheels of this axle roll back over the treadle in the reverse direction, that is opposite to the normal direction of traffic, this roll-back actuation will energize and lock up relays C, D, and relay H will be energized by overlapping actuation of switch groups 2 and 1 and will be held energized by continued concurrent actuation of switch group 1 and energization of relay C. However, as the wheel in rolling back leaves switch group 2, in completing the roll-back actuation with relays C, D, and H energized as described, the restoration of relays A and B to their deenergized condition by the wheels leaving the directional contacts in the roll-back direction will close the break contacts of relays A and B, thus extending positive power from the make contact C5—6 of relay C via wires 107, 106 and over the break contacts B7—80 and A7—80 of relays B and A in series and over the make contact D7—8 of relay D and the main roll-back actuation power circuit 97 via a make contact H5—6 on relay H and a break contact J7—30 on relay J through the single wheel roll back actuation circuit 1WB to the single wheel roll-back and counting circuit in Fig. 8.

Power would thus be supplied over wire 1WB to junction 141 at a make before break contact N400—4 on relay N at which junction the circuit continues in two branches—the first circuit thru the make before break N400—4 of relay N to the positive side N2 of the coil of relay N, the second branch continues on thru junction 141 via wire 1WB and through the break contact P3—40 of relay P and wire 142 to the positive side O2 of the coil of relay O. Relay O would thus be energized as the other side O1 of the coil of this relay is grounded.

The operation of relay O causes relay N to operate by supplying ground to the negative side N1 of the coil of relay N over wire 143 and the make contact O3—4 of relay O, positive power being supplied to the coil of relay N as described above. After initial operation, relay N locks up over its own contacts as follows: on the positive side N2 over the make before break contact N3—4 of relay N and wire 144 through the break contact M3—40 of relay M and via wire 145 in series with the break contact MS3—40 of the operator's key to the positive side of the power supply; on the negative side N1 relay N locks up to ground over its own make contact N7—8. The operation of relay N applies positive power thru its own make contact N9—10 via wire 146 in series with the make contact O5—6 of relay O to wire 111 and thus to the coil of the release relay G as previously described, thus releasing relay C and restoring the relays D, H and O to normal as the positive power from relay C is removed. Relay O in restoring to normal operates relay P by supplying positive power from the make contact N9—10 of relay N via wire 146 thru the break contact O7—80 of relay O to the positive side P2 of the coil of relay P, the other side P1 of the coil of relay P being grounded. From the above it will be noted that the reverse actuation of the treadle has caused the relays N and P to remain in the energized position under the control of relay M or the operator's key, thus storing the first single wheel rollback actuation in step 1 of the single wheel chain circuit of Fig. 8. Assuming the next actuation to be of forward single wheel classification, positive potential from relay C, as previously described, will be available over wire 1WF at the make before break contacts N6—600 of relay N in Fig. 8. Relay N being energized, as assumed for the moment due to the previous reverse actuation, positive power will proceed thru the make contact N5—6 of relay N to wire 147 and junction 148, from which point it will divide into two branch circuits to the make before break contacts M5—6—600 of relay M; the first branch via wire 151 terminating at the make contact M5 of the make before break assembly and the second branch proceeding thru the break contacts M600—6 of said assembly to the positive side M2 of relay M. The other side M1 of the coil of relay M being grounded, relay M will operate. With relay N in the energized condition, relay M locks itself up over the make contact M5—6 of its own make before break assembly and the first branch circuit from make contact N5—6 of relay N as just described.

The energization of relay M releases relay N by opening its break contacts M3—40 thus removing from relay N the positive power from the operator's key switch MS which held relay N energized as previously described. With the release of relay N the holding circuit for relay M is reestablished from the positive side M2 of the coil of relay M over its own make contacts M7—8 and via wire 153 thru the break contacts N600—6 of the make before break assembly of relay N to positive power via wire 1WF from relay C as previously described. Relay P is deenergized concurrently with relay N since the opening of the make contact N9—10 of relay N removes positive power from the coil of relay P, as previously described. Relay M still being in the energized condition, positive power from the break contact MS3—40 of the operator's key switch is supplied thru the make contacts M3—4 of relay M to wire 111 and thus to the release relay G, thus restoring the treadle relays to normal and deenergizing relay M thru the removal of positive power from relay C as previously described. As may be noted from the above, no count was recorded for the last forward actuation, said actuation being used to cancel out the previously accrued reverse or roll-back actuation which was stored up by relay N.

*Assuming two successive reverse actuations in the single wheel classification to have taken place*, i. e., had we assumed the last actuation to have been a reverse instead of a forward actuation, the following relay operation would have occurred: as previously described, the first reverse actuation would have left relay N and relay P energized in step 1 of the relay chain circuit, with the other relays in the single wheel roll-back and counting circuit in the deenergized, or normal position. The second reverse actuation in this single wheel classification would provide positive power from relay C over wire 1WB as previously described, to the common armature P3 of relay P. Relay P being energized, positive power would continue from armature P3 over the make contact P3—4 of this relay and via wire 154 to junction 155 from which point it would divide into two branch circuits, the first proceeding via wire 156 through the break contact R400—4 of the make before break assembly of relay R to the positive side R2 of the coil of relay R; the second branch proceeding via wire 157 to the positive side S2 of the coil of relay S. The other side of the coil of relay S being grounded, relay S would be energized.

In similar manner to that described for the first reverse actuation in the single wheel classification in step 1 of the relay chain, the operation of relay S in step 2 of this relay chain would cause relay R to operate and lock up over its own contacts and the break contact Q3—40 of relay Q. The release relay G would be energized over wire 111 by the operation of relay R thus restoring the treadle relays and relay S to normal. We would then have the following relays energized in steps 1 and 2 of the relay chain in the single wheel roll-back and counting group after the completion of the second successive reverse actuation in the single wheel classification: relay N, relay P and relay R.

Any further reverse actuations in this group, occurring before a forward actuation was recorded, would simply operate relay S, which operation would energize the coil of the release relay G by positive power from the make contact R9—10 of relay R over the make contact S5—6 of relay S to wire 111. The operation of relay G would restore the treadle relays to normal, as previously described, and also the relay S by removal of positive power from relay C.

*Assuming successive forward single wheel actuations following successive roll-back single wheel actuations.*—The aforementioned occurrence of two successive reverse single wheel axle actuations would, for example, represent a passenger car with two axles and four wheels rolling back over the treadle in the reverse direction to normal traffic. If it is now assumed that this vehicle reverses its direction and proceeds forward over the treadle before another vehicle crosses the treadle, we have the following condition. The first forward axle actuation would operate relay M and restore relays N and P to normal as previously described. The second forward axle actuation provides positive power to the positive side U2 of relay U and also to the contact R6 of the make before break assembly of relay R. Relay R being energized, positive power would proceed via make contact R5—6 and wires 158, and 162, and break contact Q600—6 to Q2 to operate relay Q in similar manner to that previously described for relay M.

The energization of relay Q would, similarly to that of relay M in step I of the relay chain as described, cause relay R to become deenergized and through the operation of the release relay G by positive power over the make contact Q3—4 of relay Q and wire 111, would restore the treadle relays and relay Q to normal by the removal of positive power from relay C. Thus the second forward actuation in deenergizing relay R cancelled out the previously accrued second reverse actuation as represented in the initial energization of relay R. Therefore the counter T did not record either of the above mentioned forward actuations as counts as they were offset by previously accrued roll-back actuations. At this point then, all of the relays in the single wheel roll-back and counting group have been restored to their normal position.

*Considering now the dual wheel roll-back and counting circuit, assume that a six wheel truck, i. e., one front axle with single wheels and a rear axle with dual wheels, has passed over the treadle in the normal forward direction of traffic.—* Let us further assume that there are no roll-backs to be accounted for in either classification and that the single wheel count of this truck was duly registered on the counter T. The forward actuation of the dual wheel axle would have energized relays C and J, as previously described, and positive power would be available at junction 182 on wire 2WF in Fig. 9 from make contact J11—12 of relay J. From this point positive power would proceed in two branches, the first branch to the right through the break contact W400—4 of the make before break assembly of relay W to the positive side W2 of the coil of relay W; the second branch via the lower part of wire 2WF extending positive power through the break contact Y3—40 of relay Y and via wire 183 to the positive side X2 of the coil of relay X. The other side of the coil of relay X being grounded, relay X would be energized.

The energization of relay X would connect ground via make contact X3—4 and wire 184 to the coil of relay W at W1 and relay W would operate with positive power supplied to coil terminal W2 over the first branch circuit from relay J, just described. After initial energization, relay W locks itself up over the make contact W3—4 of its make before break assembly via wire 185 in series with a break contact V3—40 on relay V to the positive power, the ground side W1 of the relay W coil locking up over its own make contact W11—12 and wire 187 through the break contacts Z3—40 of relay Z to ground. Relay W, therefore, remains energized after initial energization as long as relays V and Z remain deenergized.

The operation of relay W with relay X causes the release relay G to be energized by supplying positive power over the make contacts W7—8 of relay W in series with the make contacts X5—6 of relay X to wire 112 and the positive side of the coil of relay G.

Concurrent with the operation of release relay G, positive power, as previously explained, is removed from wire 2WF of the forward counting circuit and thus also from wire 183 and relay X restores to normal. The deenergization of relay X causes relay Y to operate with positive power supplied from the make contacts W7—8 of relay W in the operated position through the break contacts X7—80 of relay X to the positive side of the coil Y2 of relay Y, the other side of the relay Y coil being grounded.

Thus, under the conditions assumed above, for the passage of a six wheel truck over the treadle, one forward axle count was registered on counter T in the single wheel roll-back and counting circuit, and relays W and Y remained energized in step I of the relay chain in the dual wheel roll-back and counting circuit. At this point all other relays would be in the deenergized or normal position.

*Assume now that the next vehicle over the treadle in a forward direction, following the aforementioned six wheel truck, is a 14 wheel truck, i. e., a front axle of two wheels and three following axles of four wheels each.—*Let us further assume that the operator's key has not been removed or inserted in the interval so that the switch MS remains in the normal position shown in Fig. 8. The single wheel forward actuation by the front axle, would, as explained previously, provide positive power to one side U2 of the coil of relay U and also operate the counter T in the single wheel roll-back and counting circuit in Fig. 8. Since relay W in the dual wheel roll-back and counting circuit in Fig. 9 is energized from the passage of the previous dual wheel axle of the previous six wheel truck, relay U will become energized through the ground supplied to it over the make contacts W15—16 of relay W and wire 188. After initial energization relay U locks up (together with counter T via wire 165, break contact R6—600 wire 169, break contact Q7—80 and wire 172) to positive power over the make contact U3—4 of relay U, wires 189 and 192 and the make contact W9—10 of relay W. The treadle relays are restored to normal through the energization of release relay G by positive power supplied over the make contacts of counter T to wire 111 and the positive side of the coil of relay G.

The operation of relay U in the single wheel roll back and counter circuit in Fig. 8 causes the energization of counter FA in the dual wheel roll-back and counter circuit in Fig. 9, by supplying positive power in series through the make contact U5—6 of relay U, wire 191 the make contact W13—14 of relay W, wire 207, the break contact BA11—120 of relay BA and wire 208 to the positive side FA2 of counter FA, the other side of counter FA being grounded. Relay Z operates concurrently with counter FA through positive power supplied over the make contact FA4—3 of counter FA via wires 196 and 195 to the positive side Z2 of the coil of relay Z, the other side of the coil being grounded.

The energization of relay Z establishes a parallel holding circuit for relay U and counter T from contact U3—4 and wire 189 as previously described, and from junction 193 over wire 194 and the make contacts Z5—6 of relay Z and wires 195, 196 and the make contact FA3—4 of counter FA to positive power.

Concurrent with the operation of relay Z, relays W and Y are deenergized by the opening of their ground circuit over the break contacts Z3—40 of relay Z, as previously described. Concurrent with the deenergization of relay W, the relay U returns to normal since its ground circuit, as previously described, is opened at W15—

16. The deenergization of relay U opens the locking circuit previously described over contacts U3—4, R6—600 and Q7—80 to counter T, allowing the latter to return to normal and thus to restore release relay G to normal through the removal of positive power to the coil of relay G over wire 111 from the make contacts of counter T. At this point then, under the previous assumption, one forward single wheel actuation of the ten wheel truck has been registered by counter T and all relays in the single and dual wheel roll-back and counting circuits as well as the treadle relays have been restored to normal, and the dual wheel axle of the previous six wheel truck has been registered by the counter FA.

The next actuation of the treadle by the 14 wheel truck would be of dual wheel classification by the second axle of the vehicle, and this would hold energized the relays W and Y, of step 1 of the dual wheel relay chain as previously explained. The following axle would give a second successive dual wheel actuation. As previously explained, positive power would then be available at the make contact Y3—4 of the Y relay, both Y and W relays being in the energized position. Positive power would then be extended over the make contact Y3—4 of the Y relay via wire 197 in the two circuit branches: at junction 198 the first branch proceeding via wire 199 through the break contacts BA400—4 of the make before break assembly on the BA relay to the positive side BA2 of the BA coil, and the second branch via wire 202 extending positive power over the break contact DA3—40 of the DA relay and wire 203 to the positive side CA2 of the CA coil. The other side of the CA coil being grounded, relay CA would be energized.

In similar manner to the previous dual wheel actuations in step 1 of the relay chain, the operation of relay CA in step 2 will operate and lock up relay BA with relay DA energizing when relay CA restores to normal. In similar manner to that previously explained for step 1, the operation of relay BA causes the deenergization of the treadle relays, and at this point, with the 14 wheel truck having passed over the treadle to the extent of three axles in a forward direction, all relays are in the normal position excepting relays W, Y, BA and DA of steps 1 and 2 of the dual wheel relay chain, which relays remain in the energized position. Also at this point other than previously mentioned, no further single or dual wheel counts have been registered.

When the fourth and last axle, which is the third dual wheel axle, of the 14 wheel truck passes over the treadle, the dual wheel actuation extends positive power, over wires 2WF, 197 and 202 as previously explained, to the contacts of the DA relay. From this point the positive power is extended over the make contacts DA3—4 of the DA relay and wire 212 through the break contacts GA400—4 of the make before break assembly on relay GA to the positive side GA2 of the coil of the relay GA. Relay GA will be energized through the ground furnished the other side G1 of its coil via wire 204 over the break contact JA3—40 of counter JA wires 205 187 and break contact Z3—40 of relay Z. Counter HA will operate concurrently with relay GA by positive power extended from the contact GA400 on the latter relay through the make contacts GA6—5 on this same GA relay and wire 213 to the positive side HA2 of the coil of counter HA, the other side of the coil being grounded. The operation of counter HA causes the concurrent operation of release relay G by means of the positive power supplied via wire 112 to the coil of release relay G over the make contacts HA3—4 of counter HA. Counter HA will be released upon termination of power from wire 2WF at contact GA400 of relay GA upon release of relay C by operation of the release relay G. Relay GA will remain energized over its make contact GA3—4 on its positive side and over the circuit previously traced from wire 204 on its opposite side. The break contact GA4—400 remains open with relay GA remaining energized.

From the foregoing it is evident that in the preferred form of the invention, counter HA records all consecutive forward dual wheel axle actuations above two in number, and any accrued forward dual wheel actuations stored by relays W and BA, which actuations were part of the sequence counted by counter HA, will not again be counted by counters EA or FA. For example, if a single wheel axle actuation should occur following the above assumed axle sequence, i. e., the sequence of one single followed by three dual wheel axles, the accrued dual wheel actuations would be treated as follows: As explained previously, the new single wheel forward actuation would operate and lock up the counter T and the relay U. As a result of the three previous dual wheel actuations, at this point the relays W, Y, BA, DA and GA are in the energized position.

Under these conditions relay Z would operate concurrently with relay U, by positive power being supplied over the make contacts U5—6 of relay U, wire 191, the make contacts W13—14 of relay W, wire 207 the make contacts BA11—12 of relay BA, wire 214, the make contact GA7—8 of relay GA, wire 215, junction 216, wire 195, to the positive side Z2 of coil Z, the other side of the coil being grounded. As previously explained, the operation of relay Z would remove the ground at Z3—40 from wires 187, 205 and 204 and cause the deenergization of relays W, Y, BA, DA and GA. The deenergization of relay W would at contact W15—16 open the ground circuit via wire 188 to relay U causing it to become deenergized and thus restoring release relay G to normal concurrently with the deenergization of counter T as previously explained. Thus the dual wheel roll-back and counting circuit has been cleared and no additional forward dual wheel actuations recorded.

Effect of dual wheel reverse or roll-back actuations

As stated previously, in the preferred form of the invention forward actuations up to a limit of two in number in the dual wheel roll-back and counting circuit are cleared by reverse actuations, and any excess of reverse actuations over previously stored forward actuations is counted by means of a counter JA in Fig. 9. The clearing of the stored forward actuations is in reverse order to that of their accrual, i. e., the first reverse actuation will clear the last stored forward actuation, the second reverse actuation will clear the next to the last stored forward actuation. The embodiment in the invention of this feature of cancellation of forward dual wheel actuations in the reverse order of their accrual, permits the recording of net forward dual wheel actuations in their proper sequence groups as well as reflecting the total number of dual wheel actuations.

To illustrate, let us revert to the previous example wherein was described the treadle actuation by a 14 wheel truck passing over the treadle in a forward direction. Assume further that no previous roll-backs are to be accounted for in either counting circuit and that no other treadle actuations have been recorded since the passage of the above truck. At this point then all relays are in the normal deenergized position with the exception of the following which are in the energized position: relays W, Y, BA, DA, and GA, and, for the passage of this truck, the counters T and HA have been actuated once.

If, at this point, the truck should reverse its direction and roll back over the treadle, the fourth axle of the truck in passing over the treadle would cause a dual wheel reverse actuation. As previously described relay J would be energized and positive power from relay C would be available at the make contact J5—6 of relay J. From this contact positive power would be extended via wire 2WB to the make contacts BA5—6 of the make before break assembly on relay BA, and then on via wire 217 and junction 218 through two branch circuits to the make before break assembly of relay AA; the first branch via wire 221 terminating at make contact AA5; the second branch continuing via wire 222 through the break contact AA600—6 to the positive side AA2 of coil AA. Relay AA will be energized as the other side of the coil is grounded. After initial energization relay AA will lock up over the first branch circuit from relay BA, as just described.

Concurrent with the energization of relay AA, relay BA will be deenergized through the loss of positive power supplying its holding circuit over the break contact AA3—40 of relay AA via wire 223 the make contact BA3—4 of the make before break assembly of relay BA to the positive side BA2 of coil BA. The deenergization of relay BA transfers the holding circuit of relay AA as follows: from the positive side AA2 of coil AA over the make contact AA7—8 of relay AA, the break contact BA600—6 of the 2WB from relay C. Thus relay AA will remain energized until the treadle relays are deenergized.

Concurrent with the deenergization of relay BA, relay DA is deenergized due to the loss of positive power supplied over the make contacts BA7—8 of relay BA. The energization of relay AA energizes the release relay G by applying positive power to the coil of G over the make contact AA3—4 and wire 112. Concurrent with the deenergization of relay C, relay AA is restored to normal as explained previously.

At this point then all relays are in the deenergized position excepting the relays W and Y in step 1 of the dual wheel roll-back and counting circuit. Should the vehicle continue to roll back over the treadle the third axle in passing over the treadle would cause a second reverse dual wheel actuation. Again as previously described, positive power would be available on wire 2WB at contact J6 on relay J. From this point positive power would be extended to relay V over the break contact BA6—600 of the make before break assembly of relay BA; over the break contact AA7—80 of relay AA via wire 224 over the make contact W5—6 of the make before break assembly of relay W, and via wire 225 and junction 226 through two branch circuits to the make before break assembly on relay V, the first branch via wire 227 terminating at contact V5 and the second branch via wire 228 proceeding over the break contacts V600—6 of the make before break assembly of relay V to the positive side V2 of the coil V. The other side of coil V being grounded, relay V would be energized.

In similar manner to that explained for the previous reverse dual wheel actuation, the energization of relay V deenergizes the relays W and Y and relay V returns to normal with the deenergization of relay C and consequent termination of power on wire 2WB. At this point then all relays are in the normal position with the exception of relay GA which remains in the energized position.

It will be noted that should the vehicle reverse its direction and proceed over the treadle in a forward direction at this point, or at any time between this and the original reversal of direction, the relays W, Y, BA and DA of steps 1 and 2 of the relay chain would again be energized, as previously explained, and the single wheel axle of the next following vehicle would clear the dual wheel roll-back and counting circuit without actuating any of the dual wheel counters since the relay GA has not been released.

Should, however, the truck continue to roll back over the treadle, the second axle of the vehicle would cause the third successive reverse actuation in the dual wheel classification. Again, as previously described, positive power would be available on wire 2WB at contact J6 of relay J. Positive power would then be extended to counter JA from 2WB via break contact BA6—600, break contact AA7—80, wire 224, break contact W6—600 of relay W, the break contacts V7—80 of relay V and wire 231 to the positive side JA2 of counter coil JA. Counter JA would be energized as the other side of its coil is grounded. Concurrent with the operation of counter JA, relay GA would release due to the breaking of the ground circuit to this relay via the break contacts JA3—40 of counter JA.

The energization of counter JA causes release relay G to operate by supplying positive power to the coil of relay G over the make contacts JA5—6 of counter JA and wire 112. Concurrent with the deenergization of relay C, counter JA is restored to normal by termination of power on wire 2WB.

At this point then, all relays in the treadle and the roll-back and counting circuits have been restored to their normal deenergized positions, the counters T and HA having registered one forward count for the vehicle and the counter JA having registered one offsetting reverse count against counter HA. If the vehicle continues to roll back and clear the treadle, the first axle of the truck would cause a reverse single wheel actuation and thus, as previously explained, would cause relays N and P in step 1 of the single wheel relay chain in Fig. 8 to become and remain energized until cleared by the next single wheel forward actuation. The net forward count as a result of the 14 wheel truck passing over the treadle in a forward direction and rolling back over the treadle in the reverse direction, would, therefore, be zero.

In the case of a ten wheel truck, that is one having one single wheel front axle followed by two successive dual wheel axles, passing over the treadle after all relays have been returned to normal deenergized condition from clearing of all prior actuations, for example the single wheel axle actuation will operate counter T as previously described, and the two dual wheel axles will set up the relays W and Y of step 1 and relays BA and DA of step 2 of the dual wheel chain circuit of Fig. 9 as previously described for the first three axles of a fourteen wheel truck having four axles.

However the two dual wheel axle actuations will complete the actuation sequence for the ten wheel truck and the two dual wheel actuations accrued in steps 1 and 2 of the dual wheel relay chain will remain until the next forward single wheel actuation by a following vehicle, assuming no intervening roll-back actuations. Such next forward single wheel actuation by the vehicle following the ten wheel truck will operate counter EA and clear the accrued dual wheel actuations by releasing the chain relays as follows.

A single wheel forward actuation power pulse will be supplied over the branch circuit as previously described to relay U which will be energized because grounded power is already connected to its lower side over the make contact W15—16 of relay W, and positive power will therefore be supplied via make contact U5—6 of relay U wire 191, make contact W13—14 of relay W, wire 207, and make contact BA11—12 of relay BA, wire 214, break contact GA7—80 of relay GA, wire 232, to the upper side EA2 of the coil of the counter EA the lower side EA1 of the coil of which is connected to ground. Thus counter EA will be actuated showing a count of a vehicle having a single wheel axle followed by a pair of dual wheel axles in succession. Actuation of this counter at its make contact EA3—4 also will energize relay Z over wire 195 to open its contact Z3—40 and thus release the relays W and BA and relays Y and DA and reset the relay circuit to normal. The treadle relays will be released by operation of relay G by counter T.

It will be noted that there are only two steps provided in the single wheel relay chain circuit, based on the assumption that normally only two single wheel axles will be rolling back over the treadle in sequence before either a forward actuation is received or some dual wheel actuation is received.

It will be appreciated however that if it were desired to provide additional steps in the single wheel roll-back relay chain, another group of relays and relay circuits identical with those in the first group comprising relays M, N, O and P could be provided for the second step in place of the present second step group of relays Q, R, S. The left side connections of relays Q, R, and S in that case would be transferred to the make contact of the transfer relay of the second group in this alternative form corresponding to relay P of the first group. If desired, still further additional steps in the chain could be introduced between the first group relays M, N, O, P and the last group relays Q, R, S since the internal circuit arrangements of each of the relay groups in each successive step between the first and last would correspond to the first group of relays M, N, O and P and the last group would always correspond with relays Q, R, S.

It will also be appreciated that additional steps in the dual wheel relay chain circuit similarly may be inserted between step 2 and relay GA serving to some extent as the last step, if desired together with an additional counter similar to EA and FA, to be operated by a single wheel clearing actuation through the added intermediate step in the chain. With such additional step the circuit for counter EA via wire 232 and break contact 7—80, would pass through a similar break contact on the relay of the added third step corresponding to relays BA and W for the second and first steps instead of through break contact GA7—80 on relay GA; and the operating circuit for the new counter would extend from a make contact on the relay of the third step through break contact 7—80 on relay GA, as will be obvious to those skilled in the art.

*Considering now the operator's clearing circuit in Fig. 8,* in a preferred embodiment of the invention, such as a toll collecting station, for example, auxiliary equipment may be used to provide printed records, collector identification, etc. In order to clear the accrued forward dual wheel actuations and thus show them on their associated counters at such times as these totals may be required, and further to clear any roll-back credits in the single wheel roll back and counting circuit so as to restore all relays to normal position for an oncoming shift of collectors, for example, there is provided an operator's key device. In the preferred form of the invention this key device would be a tamper-proof device accessible to authorized persons only, and it would be so constructed as to give a momentary operation of the contacts on insertion or removal of such key. In the preferred form of the invention the operator's key would perform two functions simultaneously, but for ease of construction or suitability of operations, these functions may be performed by separate keys.

On insertion or removal of the key the break contacts MS3—40 of the key contact assembly remove positive power momentarily from the break contacts 3—40 of relays M and Q and thus allow relays N and R to restore to normal, should they be in the energized position, by opening the holding circuit previously described. As previously described, all energized relays in the single wheel roll-back and counting circuit would thereby be restored to the normal or deenergized position. Also upon insertion or removal of the operator's key positive power is momentarily applied to the contact U5 of relay U. As previously explained, any accrued forward dual wheel actuations will thereby be recorded by their respective counters by positive power on wire #191.

The operation of the switch device MS may also be employed to actuate a printing recorder or other related auxiliary recording or indicating device PR from positive power supplied through its make contact MS3—4 as shown in Fig. 8 for example.

Considering now in Fig. 6 the individual dual wheel and single wheel circuits through the several switches of the classification switch group, switch group 1, of the treadle it will be noted that the dual wheel circuit 2WC connecting from the upper side J2 of relay J in Fig. 7, also connects to the right hand one TJ1 of a group of five test jacks TJ above the treadle switches in Fig. 6, and in addition connects along the right side of the entire group of treadle switches of the classification group in Fig. 6, with branches extending to the left from this main dual wheel circuit 2WC to each of the several sections of the treadle. The inner circuit 1WC connects with the upper side H2 of relay H in Fig. 7 and with the next test jack TJ2 in Fig. 6, is the main single wheel actuation circuit from the treadle switches.

In Fig. 6 the several treadle sections shown schematically are designated 1TS, 2TS, 3TS, etc. from the upper end of the treadle in the drawing to 0TS, NTS, and LTS at the lower end of the treadle. The sections 1TS, 2TS and 3TS represent a starting group for the wiring at one end of the treadle, the sections 4TS and 5TS represent a general intermediate group of which as many more with wiring alike may be added as needed, and sections OTS, NTS and LTS represent the terminating group illustrating the wiring at the other end of the treadle. Horizontal long dash lines between sections 3TS and 4TS and between sections 5TS and OTS in Fig. 6 indicate the dividing lines between the starting group, the intermediate group and the terminating group, for convenience of reference.

The contacts of each section are numbered from right to left and are referred to as ITS1, ITS2, ITS3, etc., for section ITS for example, 2TS1, 2TS2, etc., for section 2TS, and so on, continuing for the several sections, in each case corresponding to the section number appearing with the arrow opposite each line of switches.

Referring now to the dual wheel branch circuits extending through the treadle contacts from the main dual wheel circuit 2WC, the outer wire extending up and down along the right side of Fig. 6, and considering first the circuit IT1 extending from the main dual wheel circuit 2WC to the first section ITS, it will be noted that this circuit IT1 has two branches starting with section ITS, one branch passing through a make contact ITS1—2 in the first section, wire IT2, a break contact 2TS6—5 in the second section, wire 2T5, a make contact 4TS7—8 in the fourth section, wire 4T8, a break contact 5TS9—10 in the fifth section, wire 5T9, a break contact OTS11—12 in the sixth section or OTS section, wire OT11 and a break contact NTS13—14 in the next adjacent section NTS below, all in series to ground on wire 91. The second branch of this dual wheel circuit 2WC via wire IT1 extends through wire IT4 and a make contact ITS4—5 in the first section, wire IT5, a make contact 3TS7—8 in the third section, wire 3T8, a break contact 4TS9—10 in the fourth section, wire 4T9, a break contact 5TS11—12 in the fifth section, wire 5T11 and a break contact OTS13—14 in the sixth section or OTS section in series to ground at wire 91.

Considering the second section, and the dual wheel branch circuits starting in this section, another branch circuit 2T1 from the main dual wheel circuit 2WC extends through make contact 2TS1—2 in the second section, wire 2T2, a break contact 3TS5—5 in the third section, wire 3T5, a make contact 5TS7—8 in the fifth section, wire 5T8, a break contact in the adjacent section below (i. e. the sixth section), illustrated by the break contact OTS9—10 in section OTS, wire OT9, a break contact in the next adjacent section below (i. e. the seventh section), illustrated by the break contact NTS11—12 in section NTS, and a break contact in the next adjacent section below (i. e. the eighth section) illustrated by break contact LTS13—14 in series to ground at wire 91. The second branch circuit 2T4 (from 2T1 and 2WC) starting from the second section as an initial section, passes in series through a make contact 2TS4—5 in the second section, wire 2T5, a make contact 4TS7—8 in the fourth section, wire 4T8, a break contact in the adjacent section below (i. e. the fifth section) illustrated by break contact 5TS9—10, wire 5T9, a break contact in the next adjacent section below (i. e. the sixth section) illustrated by break contact OTS11—12 in section OTS, wire OT11, and a break contact in the next adjacent section below (i. e. section 7) illustrated by break contact NTS13—14 in section NTS, in series to ground at wire 91. It will be noted that the latter part of the second branch circuit starting in section 2TS, beyond the make contact 2TS4—5, is common to the first branch circuit starting in section ITS.

Thus summarizing for each starting section or intermediate section as an initial section, there are two dual wheel branch circuits starting from the main dual wheel circuit 2WC and extending through contacts in the initial section and in certain of the sections below the initial section as exemplified by the circuits described above starting with the first and second sections as initial sections, except that for those circuits starting at intermediate sections near the terminating sections at the lower end of the treadle the terminating end of these circuits is varied slightly as will be described below. However, considering the two typical complete dual wheel branch circuits starting from the main dual wheel circuit 2WC, one branch extends in series through a make contact in the initial section, a break contact in the next adjacent section below, a make contact in the second following section below such adjacent section, and break contacts in the next three adjacent sections below the previously mentioned second following section, to ground. The other branch circuit extends from circuit 2WC in series through a make contact in the initial section, a make contact in the second following section below, and break contacts in the three next adjacent sections below the previously mentioned second following section, to ground, and the latter part of this second branch circuit beyond the make contact in the initial section is common to the typical first branch circuit starting in the section above this initial section.

Considering now the single wheel actuation circuits extending from the inner wire IWC of the two wires extending up and down along the right side of Fig. 6, there are a series of branch circuits extending from this single wheel main circuit IWC through different combinations of the several make and break contacts in the classification switch group.

Considering the first section ITS as an initial section, for example, there is one branch circuit IT3 from the main single wheel circuit IWC and extending to the left and in series through a break contact ITS3—2 in the first section, wire IT2, a break contact 2TS6—5 in the second section, wire 2T5, a make contact 4TS7—8 in the fourth section, wire 4T8, a break contact 5TS9—10 in the fifth section, wire 5T9, a break contact in the next following section below as illustrated by break contact OTS11—12 in the sixth section or OTS section, wire OT11 and a break contact in the next adjacent section below as illustrated by break contact NTS13—14 in the seventh section or NTS section, to ground. Another branch circuit IT6 (via wire IT3) from the main single wheel circuit IWC extends in series through a break contact ITS6—5 of the first section, wire IT5, a make contact 3TS7—8 in the third section, wire 3T8, a break contact 4TS9—10 in the fourth section, wire 4T9, a break contact 5TS11—12 in the fifth section, wire 5T11, and a break contact in the next adjacent section below illustrated by break contact OTS13—14 in the sixth section or section OTS in series to ground. Still another branch circuit IT6—IT7 from the main single wheel circuit IWC extends to the left through a make contact ITS7—8 in the first section, wire IT8, a break contact 2TS9—10 in the second section, wire 2T9, a break contact 3TS11—

12 in the third section, wire 3T11, and a break contact 4TS13—14 in the fourth section in series to ground. The last two mentioned circuits are typical only of the starting sections at the upper end of the treadle as to the upper end of the circuits although the lower ends of these circuits are typical of the lower terminating ends of the several branch circuits, except those starting in sections near the terminating end of the treadle as will be described below.

Considering now the second section as an initial section, there is a first branch circuit from the main single wheel circuit 1WC in series through wire 2T3, a break contact 2TS3—2 in the second section, wire 2T2, a break contact 3TS6—5 in the third section, wire 3T5, a make contact 5TS7—8 in the fifth section, wire 5T8, a break contact in the next adjacent section below (i. e. the sixth section), as illustrated by OTS9—10, wire OT9, a break contact in the next following section below (i. e. the seventh section), as illustrated by break contact NTS11—12 in section NTS, wire NT11, and a break contact in the next adjacent section below (i. e. the eighth section) as illustrated by break contact LTS13—14 in section LTS, to ground. There is another branch circuit from the main single wheel actuation circuit 1WC in series through wires 2T3 and 2T7, a make contact 2T7—8 in the second section, wire 2T8, a break contact 3TS9—10 in the third section, wire 3T9, a break contact 4TS11—12 in the fourth section, wire 4T11 and a break contact 5TS13—14 in the fifth section to ground. The last mentioned branch circuit represents a further example of a single wheel circuit from the starting sections at the upper end of the treadle as illustrated in Fig. 6, whereas the first branch circuit is typical of a complete single wheel circuit starting in the starting sections or the intermediate sections as will appear below.

Considering now the third section as an initial section, circuit 3T3 from the main single wheel actuation circuit 1WC proceeds in series through a break contact 3TS3—2 in the third section, wire 3T2, a break contact 4TS6—5 in the fourth section, wire 4T5, a make contact in the second following section below illustrated by make contact OTS7—8 in the sixth section or section OTS, wire OT8, and a break contact in the next adjacent section below as illustrated by break contact NTS9—10, wire NT9, a break contact in the next following section below as illustrated by break contact LTS11—12 in the eighth section or section LTS and via wire LT11 to ground at contact LTS14 which is connected to ground via wire 91. It will be understood that wire LT11 could be connected directly to ground via wire 91 from contact LTS11 instead of at contact LTS14 if desired but in this case in Fig. 6 as in a number of the other cross connecting circuit or jump wires as they are sometimes referred to, such as wires 1T4, 1T6 and 1T7 in the first section for example, are shown connected between contact terminals in the treadle section as typical of a convenient practice frequently followed in the art.

The single wheel circuit last described starting from the third section as an initial section, is typical, as to its upper end, of the several circuits starting from the main single wheel actuation circuit 1WC at the break contact 1TS3—2, or 2TS3—2, or 4TS3—2 at any of these starting or intermediate sections as initial sections, but differs from a typical complete single wheel circuit at the lower end of this circuit since it terminates in the last of the terminating sections, section LTS, and therefore is connected directly from the break contact LTS11—12 to ground instead of continuing beyond break contact LTS11—12 through another break contact in the next adjacent section below LTS if there were such a section.

Considering now the terminating sections OTS, NTS and LTS at the lower end of the treadle in Fig. 6 it will be noted that the break-make contacts OTS3—2—1 are not used in section OTS and that the break-make contacts NTS3—2—1 and the break-make contacts NTS6—5—4 are not used in section NTS. It will also be noted that the break-make contacts LTS3—2—1 and break-make contacts LTS6—5—4 are not used in the last section LTS. It will be further noted that the last single wheel branch circuit toward the lower end of the treadle in Fig. 6 starts from wire 1WC at the section above section OTS which is illustrated by section 5TS, although there may be further intermediate sections between 5TS and OTS. For example if there were twelve additional intermediate sections or a total of twenty sections in the treadle, then the seventeenth section 17TS would be the next section above OTS and the wiring between section 17TS and section OTS through LTS would be as illustrated by the wiring between 5TS and OTS through LTS in Fig. 6. Thus starting from wire 1WC and wire 5T3 as an illustration the last single wheel branch circuit proceeds through a break contact 5TS3—2, wire 5T2, a break contact OTS6—5, wire OT5, a make contact LTS7—8, and continues via wire LT8 to ground at LTS14 directly via wires LT9 and LT11 instead of through break contacts in spaced sections below since there are no sections below this last section. Similarly the lower end of the next to last single wheel branch circuit extends from make contact NTS7—8, via wire NT8, and break contact LTS9—10, wires LT9 and LT11 to ground directly instead of via further break contacts below. It will also be noted that the last dual wheel branch circuit toward the lower end of the treadle in Fig. 6 starts from the main dual wheel circuit 2WC via wires OT1 and OT4, a make contact OTS4—5, wire OT5, a make contact LTS7—8, and wires LT8, LT9, and LT11 in series direct to ground at contact LTS14. It will be observed that the lower ends of the last single wheel circuit and the last dual wheel circuit are common.

Thus summarizing for each typical section considered as an initial section and having a complete single wheel branch circuit there is one such branch circuit from the main single wheel actuation circuit 1WC to ground, this branch circuit extending in series through a break contact in that section as an initial section, a break contact in the next adjacent section below, a make contact on the second following section below the latter, and break contacts in the three next adjacent sections below the previously mentioned second following section, or to describe the typical single wheel branch circuit in another way, it includes a make contact in one of the intermediate sections in series with break contacts in the second and third sections away from such intermediate section on one side of such intermediate section and in series with break contacts in the next three adjacent sections on the other side of such intermediate section. This typical single wheel branch circuit is modified at one end or the other as described above where it starts in one of the starting sections near the upper end of the treadle in Fig. 6 or where it terminates in the terminating sections at the lower end of the treadle in Fig. 6.

Summarizing in similar fashion for the dual wheel branch circuits starting from any typical section as an initial section these typical dual wheel circuits comprise one circuit including make contacts in series in the initial section and in the second following section below and another circuit including make contacts in series in the initial section and the third following section below, and these typical dual wheel circuits also include break contacts, as described more fully above in the detailed circuit description because these break contacts are necessarily present in the single wheel circuits, a part of which are used in common by the dual wheel and single wheel circuits in order to make more efficient use of contacts or switches.

From the above it will be noted that the actuation of any single section in the classification switch group 1 will connect ground to circuit 1WC as will the actuation of any two adjacent sections only. The actuation of more than two adjacent sections or of sections spaced by an intervening section (with or without actuation of the next adjacent sections toward either end of the treadle) or of spaced sections spaced by two intervening sections will cause ground to be connected to circuit 2WC in preference to circuit 1WC. Thus the sectional actuation of the switches determines the wheel classification as single or dual wheels in accordance with actuation of individual or adjacent sections or spaced sections as described above.

It will be understood that the treadle is normally installed for substantially the full width of the traffic lane so that no wheel can pass by the treadle beyond the end of the treadle.

It will be noted that the treadle circuits in Fig. 6 as above described inherently distinguish between single and dual wheels for most ordinary vehicle wheel actuation in providing one output circuit 1WC which will have ground connected to it primarily by a single wheel actuation of the treadle, and another output circuit 2WC which will be connected to ground primarily by dual wheel actuation. Thus this circuit arrangement has advantage where it is desired to have the switches installed in the treadle itself and the circuit wiring between such switches provided in the treadle itself so that the treadle primarily will provide one output circuit indicating single wheel actuation and another output circuit indicating dual wheel actuation, for connection to appropriate relay or counting circuits for example.

Figure 10:
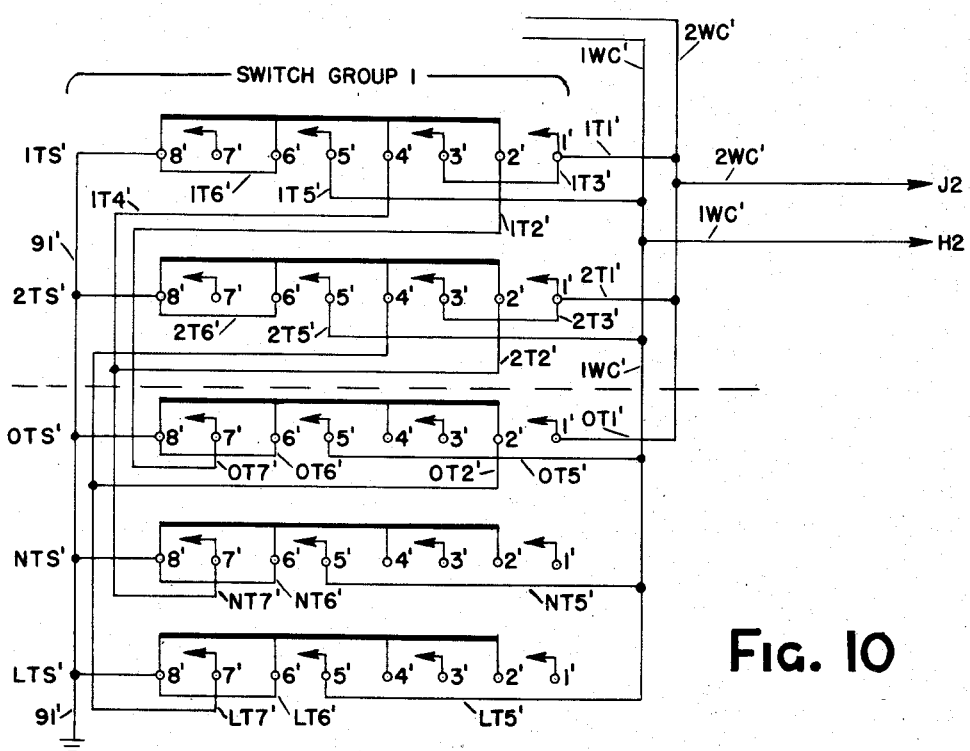
Fig. 10 shows a schematic diagram of an alternate form of circuit for the treadle switches or treadle operated contacts of several adjacent sections.

However, if it is desired to use a simpler form of treadle switch and circuit arrangement and to take advantage of a relay arrangement in which dual wheel actuations supersede single wheel actuations in the event of concurrent of dual and single wheel circuit actuations, then an alternate form of circuit as shown in Fig. 10 may be employed for example.

Figure 12:
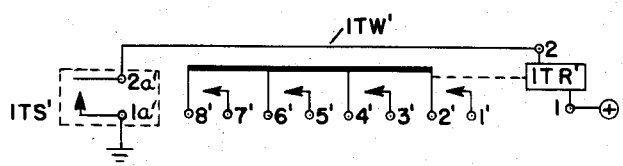
Fig. 12 shows another form of circuit in which a relay is operated by a single classification group I switch in any treadle section of Fig. 10 for example to operate the multiple classification contacts TS1' to TS8' of Fig. 10 for that section as relay contacts.

In this alternate form of circuit shown in Fig. 10 a maximum of four make contacts are employed for each treadle section, and as described above, the several contacts of any treadle section may be considered as switch contacts in the treadle section itself or as relay contacts on a relay operated by a single switch contact in the treadle section. In the latter arrangement for section 1TS, for example, a single make contact in section 1TS may be connected between ground and one side of the coil of relay, the other side of the coil of which is connected to power, and which relay is provided with the four make contacts shown in Fig. 10 for section 1. This arrangement is illustrated in Fig. 12 for example. Similarly the contacts shown in Fig. 10 for the several remaining sections could for each section be the contacts of a relay energized by a single make contact in that section connected between ground and one side of the relay coil, the other side of the coil being connected to power.

In Fig. 10 the sections are referred to as 1TS', 2TS', etc. and the contact numbers numbered from right to left 1' to 8' and referred to as 1TS1', 1TS2', etc. for section 1TS', and 2TS1', 2TS2', etc. for section 2S' and so on through the sections. In the circuit arrangement of Fig. 10 the circuit 2WC' is essentially a dual wheel circuit which is supplied with ground through the treadle contacts only by dual wheel actuation but the circuit 1WC' is not strictly a single wheel circuit, since it is supplied with ground through the treadle contacts by either single or dual wheel actuation.

However, the circuits 2WC' and 1WC' of Fig. 10 may be connected directly to coils of relays J and H respectively of Fig. 7 at terminals J2 and H2 respectively in place of circuits 2WC and 1WC of Fig. 6 since the contacts of these relays are already arranged so that concurrent actuation of the relays J and H will have the same effect on the dual wheel circuits 2WF and 2WB and single wheel circuits 1WF and 1WB as if relay J had been actuated alone by dual wheel actuation; that is, upon concurrent energization of relays J and H and energization of wire 98 or wire 97 the dual wheel circuits 2WF or 2WB respectively will be supplied with power and the single wheel circuits 1WF and 1WB will not be supplied with power. If relay H, however, is energized alone as by single wheel actuation alone, when wire 98 or wire 97 is energized, the single wheel circuits 1WF or 1WB respectively will be supplied with power and the dual wheel circuits 2WF and 2WB will not be supplied with power.

With the last mentioned circuit arrangement the operation of the counter KA as previously described via make contacts of relay H and J will indicate forward concurrent actuation of the circuits 1WC' and 2WC' but not necessarily forward concurrent single and dual wheel actuation and similarly the operation of the counter LA via other make contacts of relays J and H will indicate concurrent reverse or roll-back actuation of the circuits 1WC' and 2WC' but will not necessarily indicate concurrent single and dual wheel reverse or roll-back actuation.

In Fig. 10 the treadle sections are numbered 1TS', 2TS', OTS', NTS' and LTS' and only these five sections are shown, although it will be understood that additional sections may be inserted between section 2TS' and section OTS', with the upper ends of the circuit between sections as shown by 2T1', 2T2', 2T3', 2T4', and 2T5', in sections 2TS' for example, and the lower ends of these circuits in the second and third following sections below, or sections 4TS' and 5TS', as illustrated by NT7' and LT7' in sections NTS' and LTS' for example. Wire OT7'—1T2' illustrates the connection with the second preceding section above OTS', illustrated by section LTS' for example.

Considering now the circuits through the treadle operated contacts of the classification switch group 1 in Fig. 10 in more detail and starting with the first section 1TS', one branch circuit from wire 2WC' extends to the left via wire 1T1', via a make contact 1TS1'—2' in section 1TS', wire 1T2', and via a make contact in the third section illustrated by a wire OT1' and make contacts OTS7'—8' in section OTS' in series to ground at wire 91'. Another branch circuit starts from 1T1' via wire 1T3', a make contact 1TS3'—4' in section 1TS', wire 1T4', and via a make contact in the fourth section illustrated by wire NT7' and make contact NTS7'—8' in series to ground at wire 91'.

A branch of the 1WC' circuit extends to the left via wire 1T5', a make contact 1TS'5'—6' in section 1TS' via wire OT6' and terminal 1TS8' to ground at wire 91'.

Considering now the circuits starting in the second section 2TS', a branch circuit extending from wire 2WC' via wire 2T1' and a make contact 2TS1'—2', in section 2TS', connects via wire 2T2' to extend through a make contact in the fourth section as illustrated by wire NT7' and make contact NTS7'—8' in section NTS' to ground.

Similarly a branch circuit starts from circuit 2WC' at each typical section and extends through a make contact in that section in series with a break contact in the second following section below to ground, and a second branch circuit from the 2WC' circuit starts through another make contact in such typical section and extends through a make contact in the third following section below in series to ground.

Also for each typical section there is a branch circuit from the 1WC' circuit through a make contact in such typical section to ground. For purpose of efficient use of contacts this last mentioned make contact is common to the two branch circuits from 2WC' starting in sections above previously described.

The circuits starting in the terminating sections OTS', NTS', and LTS' at the lower end of Fig. 10 are modified slightly as described below for example, contacts OTS3'—4' in section OTS', contacts NTS1'—2' and contacts NTS3'—4' in section NTS' and contacts LTS1'—2' and contacts LTS3'—4' in section LTS' are not used. The last branch circuit from circuit 2WC' near the lower end of the treadle starts at wire OT1' via make contact OTS1'—2' and via wire OT2', wire LT7' and a make contact LTS7'—8' in the last section LTS', but each of the sections OTS', NTS', and LTS' have branch circuits extending from the circuit 1WC' through a make contact to ground.

Thus summarizing the circuits of Fig. 10 there is for each section a circuit from ground through a make contact in that section to the circuit 1WC', and there is also for each section a circuit starting from ground through a make contact in that section in series with parallel make contacts in the second and third preceding sections above such section to circuit 2WC'.

Figure 11:
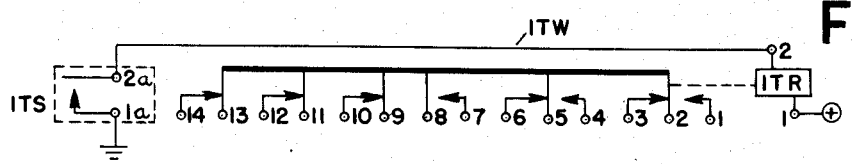
Fig. 11 shows one form of circuit in which a relay is operated by a single classification group I switch in any treadle section of Fig. 6 for example to operate the multiple classification contacts TS1 to TS14 of Fig. 6 for that section as relay contacts.

Referring now to Fig. 11 there is illustrated one arrangement of the treadle operated contacts of the classification group one of Fig. 6 as the contacts of a relay 1TR which is operated by a single make contact 1TS1a—2a in the treadle section 1TS for example in place of having all of the treadle contacts 1TS1 to 1TS14 in the treadle section itself. In this arrangement the several contacts numbered one through fourteen from right to left will be referred to as make contact 1TR1—2, break contact 1TR2—3, and so on, corresponding to the contacts 1TS1—2, 1TS2—3, and so on in section 1TS of Fig. 6 and would be operated to close the make contacts and open the break contacts upon energization of the coil of relay 1TR by closure of treadle switch 1TS1a—2a, completing a circuit from ground via 1TS1a—2a, wire 1TW, to the upper side 1TR2 of the coil of relay 1TR, the other side 1TR1 being connected to positive power. A corresponding arrangement may be employed for all of the other treadle sections of Fig. 6 if desired.

Referring to Fig. 12 there is illustrated one form of circuit in which the treadle operated contacts of Fig. 10 are operated as the contacts of the relay 1TR' which in turn is operated by a single switch or make contact 1TS1a'—2a' in the treadle section 1TR' for example, in place of having the contacts 1TS1' through 1TS8' in the treadle itself. In Fig. 12 the contacts marked 1' through 8' are referred to as contacts 1TR1'—2' and so forth and are make contacts corresponding to the contacts 1TS1'—2' and so forth of section 1TS' of Fig. 10.

The contacts 1TR1'—2', 1TR3'—4', 1TR5'—6' and 1TR7'—8' are closed upon energization of the coil of relay 1TR' by closure of the switch or make contacts 1TS1a'—2a', via wire 1TW' to the upper side 1TR'2 of the coil of 1TR', the other side 1TR'1 of the coil being connected with positive power. A corresponding circuit arrangement may be employed for all of the other treadle sections of Fig. 10 if desired.

Referring again to Fig. 6, in relation to the description of the connections of the second and third switch groups and wires 81 and 82 respectively to wires 85 and 86 respectively, it will be noted that wire 81 is connected to wire 85 via the contacts RS3—4 of a switch RS and that wire 82 is connected to wire 86 via contacts RS1—2 of this switch with the switch in the upper position shown in the drawing. This switch RS is a double pole double throw switch for interchanging the forward and roll-back counting with respect to the direction of travel over the treadle if desired by interchanging the connections between wires 81 and 82 from the treadle switch groups 2 and 3 and the wires 85 and 86 to relays A and B of Fig. 7. Thus if the switch RS is thrown into its lower position instead of its upper position as shown in the drawing, the switch in its lower position will connect wire 81 via wire 83 and switch contacts RS5—1 to wire 86, and will connect wire 82 via wire 84 and switch contacts RS8—3 to wire 85. This switch arrangement is desirable where a toll collection lane having one treadle is employed for traffic in one direction as the forward direction at one time of day and for traffic in the opposite direction as the forward direction at another time of day, for example.

Referring again to Figs. 7 through 9 it will be noted that relays M, Q, V, and AA are preferably slow-operating, as indicated in the drawings by the black shading at one end of the coil, to assure release of the associated relay chain step below before termination of the power pulse over circuit 1WF or 2WB by operation of the release relay G to release the relay C. Counters K and L are also preferably slow-operating, as similarly indicated in the drawings, to avoid operation of these counters to operate the release relay G in event of any momentary condition of delay of energization of relays J and H at the time the forward or reverse actuation counting power pulse starts over circuit 96 or 97.

This automatic traffic classification system, according to one important aspect of the invention, has been described above primarily from the viewpoint of classification of traffic by single and dual wheels, and for most ordinary traffic over a considerable range of vehicle tire sizes at toll collecting points on roads and bridges, for example, the system will provide such classification satisfactorily. However, the invention in any one form or dimensional setting is not intended to classify all conceivable combinations or relatively unusual combinations of tire sizes in dual and single wheel groups, but is designed to care for the principal low toll charge and high toll charge traffic classifications at toll collection stations with which I am familiar.

In this connection the preferred embodiment of the invention employs the relatively wide total tire tread width of most dual wheels (between outer edges of the pair of tires, for example) in comparison with the relatively narrow tire tread width of most single wheels as a means of distinguishing between single and dual wheels by the actuation of one or two adjacent treadle sections for single wheels, and actuation of spaced treadle sections, with or without actuation of an intervening section, for dual wheels; and it will be understood that the width and spacing of the treadle sections, and the number of adjacent sections or the spacing between spaced sections may be chosen to suit the range of vehicle wheel spacings and tire widths on the roadway at the traffic classification station or in a particular traffic lane at a toll station, and that variations of the circuits through the treadle switches may be made accordingly by those skilled in the art, within the scope of the invention as defined by the claims.

Thus, in general the width of treadle section, along the length of the treadle transverse to the direction of traffic, will be determined largely by the range of tire sizes and corresponding dual wheel spacing predominating in the traffic for which the sectionalized treadle is to be used.

In this connection the following dimensions for treadle section width are suggested as examples suitable for use with the treadle circuits disclosed herein for a considerable range of tire sizes found in ordinary traffic, without intending to limit the scope of the invention solely to such dimensions, it being understood that considerable variation in such dimensions may be made in accordance with the type of traffic to be served and related features of design and conditions of use within the spirit of the invention as defined by the claims.

A section width of about 4 to 5 inches is suggested for traffic comprising essentially small to medium tire sizes, and a section width of about 6 to 7 inches is suggested for traffic comprising essentially the larger tire sizes, so that an overall range of about 4 to 7 inches in section width will serve most ordinary traffic needs, with widths in the middle of this range appropriate to a wide range of tire sizes between the less generally used tires near the upper limits of size for single wheels and the lower limits of size for dual wheels.

It will be generally satisfactory for the treadle section to be sensitive for actuation of its switch or switches to within about ½ inch to 1 inch from each end of its total width, so that a 6 inch total section width for example will have a sensitive width of about 4 to 5 inches.

In general a total section width of about 5½ to 6 inches with a sensitive width of about 4 to 4½ inches for example will care for a wide range of traffic in the present range of tire sizes in general use.

It will be appreciated that at many toll collection stations it is customary to set aside one or more lanes for particular or unusual types of traffic, and in some such instances it may be desired to employ one spacing between treadle sections for certain lanes and another spacing for other lanes in accordance with the range of tire sizes in the respective lanes.

It will also be appreciated that the system according to the invention may be employed to classify between relatively small or light weight vehicles and relatively large or heavy weight vehicles generally because of the greater tire width of the latter in contact with the road whether on single or dual wheels. Thus, from a toll classification viewpoint it may be satisfactory in some instances for example to count lightweight dual wheels with very narrow tire width as a single wheel and have the toll charges based on two single wheel axles for a light vehicle having single front wheels and light, unusually narrow dual rear wheels.

It will be further appreciated that although the apparatus as disclosed provides a number of traffic classification and counting features particularly for toll collection purposes and the like, it may be desired in some instances to employ one or both of the output circuits 1WC and 2WC from the treadle or treadle operated contacts or one or more of the output circuits 1WB, 1WF, 2WB, and 2WF from relays H and J for more general traffic classification or counting purposes, and for such purposes to connect one or more counters or indicating devices directly to one or more of these output circuits respectively to count or indicate traffic actuation primarily in one classification or individually in each of two or more classifications, as indicated by actuation of these respective circuits.

It will be understood that numerous further modifications may be made in the design and arrangement of the several parts of the apparatus and in substitution of equivalent parts and circuits by those skilled in the art without departing from the spirit of the invention as defined by the claims.

I claim:

1. Traffic classification apparatus including a switch treadle adapted to be disposed lengthwise transverse to a path of traffic and sectionalized along its length, classification relays operable for identification of types of vehicles by the number and combinations of sections actuated by vehicle wheels passing over said treadle in accordance with the tire tread width of such vehicle wheels, and circuits interconnecting the switches of the several sections into groups of individual and adjacent sections and of spaced sections to operate one of the relays by actuation of a single section and by actuation of adjacent sections and to operate another of said relays by actuation of spaced sections.

2. Traffic classification apparatus including a switch treadle adapted to be disposed lengthwise transverse to a traffic path and sectionalized along its length, classification relays operable for identification of dual wheel axles and single wheel axles and circuits interconnecting the switches of the several sections into groups of individual and adjacent sections and spaced sections to operate the single wheel classification relay by actuation of a single section and by concurrent actuation of two adjacent sections and to operate the dual wheel classification relay by concurrent actuation of spaced sections.

3. Traffic classification apparatus including a treadle having a multiplicity of relatively narrow sections arranged transversely to the normal direction of travel of traffic, a set of switches for each section and arranged to be operated concurrently by actuation of the treadle by a vehicle wheel rolling thereover, and two sets of circuits interconnecting the switches of adjacent sections and nearby spaced sections to provide one output circuit for identification of single wheel actuation by actuation of the switches of one section alone and by concurrent actuation of the switches of adjacent sections and another output circuit for identification of dual wheel actuations by concurrent actuation of the switches of nearby sections spaced by at least one intervening section.

4. Traffic classification apparatus including a treadle adapted to extend across a path of traffic and having a multiplicity of switch units along the length of the treadle, said switch units having a short width and close spacing transverse to said traffic path such that less than three adjacent switch units will be actuated by a single wheel rolling thereover along said path and spaced switch units separated by at least one intervening switch unit will be actuated by dual wheels rolling thereover along said path, make and break contacts associated with each switch unit to be operated by actuation of such unit, a single wheel output circuit including a make contact of one switch unit in series with break contacts of switch units spaced from said one switch unit, and a dual wheel output circuit including make contacts of two spaced switch units in series.

5. In a traffic classification apparatus having an output circuit for single wheels and an output circuit for dual wheels, a traffic actuatable switch treadle for operation of such circuits in accordance with actuation by single and dual wheels respectively, said treadle including a multiplicity of switch units sufficiently closely spaced along a line transverse to the path of traffic for a wheel traveling along such path and centered on a line between two adjacent switch units to actuate both of such adjacent units, the width of the individual switch units along the line transverse to such traffic path exceeding the width of single wheels, and the total width of two adjacent switch units being materially less than the total width between outer edges of a pair of dual wheels, whereby single and dual wheel actuations will be distinguished by actuation of single or two adjacent switch units primarily by single wheels and actuation of two non-adjacent switch units spaced by one intervening unit primarily by dual wheels.

6. In a traffic classification apparatus as in claim 5, said switch units having a width and a center to center spacing of about 4 to 7 inches along such transverse line.

7. Traffic classification apparatus including a treadle adapted to be disposed transverse to a traffic path and sectionalized along its length transverse to such path for actuation of different combinations of sections in accordance with different tire tread width of wheels and combinations of wheels of different types of vehicles, a plurality of relay circuits associated with said treadle sections for selective response to actuation of different combinations of sections, and output circuits operated by said relay circuits and including one operated for one type of vehicle and another operated by another type of vehicle.

8. Traffic counting apparatus as in claim 7 and including counters connected to the respective output circuits.

9. Traffic counting apparatus including a switch treadle sectionalized transversely to the path of traffic for distinguishing actuation by single and dual wheels, a single wheel output circuit from said treadle, a dual wheel output circuit from said treadle, a single wheel counter circuit, a plurality of dual wheel counter circuits for different numbers of successive dual wheel actuations, a multi-step chain relay circuit connected between said dual wheel output circuit and said dual wheel counter circuit to store successive dual wheel actuations in successive steps of said chain relay circuit and prepare the corresponding one of said dual wheel counting circuits for actuation, and a relay circuit connected between said single wheel output circuit and said single wheel counter circuit to actuate the latter for counting responsive to actuation of said single wheel output circuit, and a circuit connecting said last named relay circuit and said multi-step chain relay circuit upon such actuation of said single wheel counting circuit to actuate the dual wheel counting circuit previously prepared by said chain relay circuit, and a circuit actuated by actuation of any of said dual wheel counting circuits to clear all dual wheel actuations stored in said chain relay circuit.

10. In traffic counting apparatus as in claim 9, a toll collector's switch actuated upon the collector closing a period of toll collection for which the traffic counting apparatus is checking traffic and a circuit controlled by said toll collector's switch upon actuation of such switch to actuate the dual wheel counting circuit previously prepared by said chain relay circuit.

11. Traffic counting apparatus including a multi-switch treadle having a classification group of switches and associated output circuits for classification of traffic by dual wheel axle and single wheel axle actuations respectively and having a directional group of switches and associated relay circuits for distinguishing forward and roll-back actuations by wheels rolling over said treadle in the forward and reverse directions respectively, a single wheel axle counter, a plurality of counters for different numbers of successive dual wheel axles, a multi-step chain relay circuit for single wheel roll-back and forward actuations to store successive single wheel roll-back actuations and to release such stored roll-back actuations by succeeding forward actuations and to operate said single wheel axle counter by forward single wheel actuations of said treadle output and relay circuits only beyond those required to release any stored roll-back actuations, a second multi-step chain relay circuit for dual wheel roll-back and forward actuations to store successive dual wheel forward actuations and to prepare for operation a corresponding dual wheel multiple axle counter and to release such stored dual wheel forward actuations successively by succeeding dual wheel roll-back actuations, and a relay circuit connecting said single wheel chain relay circuit with said dual wheel chain relay circuit upon operation of said single wheel axle counter to operate the dual wheel axle counter previously prepared by said dual wheel chain relay circuit in accordance with the number of stored forward dual wheel axle actuations and upon operation of such dual wheel axle counter to release all such stored forward dual wheel actuations.

12. In a traffic counting apparatus, a treadle sectionalized along its length for disposition transverse to a traffic path for actuation of individual sections and combinations of sections by different widths and combinations of vehicle wheels rolling thereover, relay circuits connected to said sections to be operated by actuation of individual and of adjacent sections and by actuation of spaced sections respectively, counters and chain relay circuits for accumulating and releasing forward and roll-back actuations by operation of the respective relay circuits by vehicle actuation and operating said counters to provide a net forward count of the respective traffic classifications in accordance with the treadle sections actuated.

13. In a traffic classification apparatus, a multi-switch treadle sectionalized along its length and adapted to be disposed lengthwise transverse to a path of traffic for actuation of individual sections and combinations of sections in accordance with the tire tread width of individual wheels and combinations of wheels of a unit of traffic passing over the treadle, switch means for each section of said treadle and circuits interconnecting the switch means for the several sections in groups of individual and adjacent sections and of spaced sections, and further switch means for each section including a plurality of switches for each section arranged to be actuated in overlapping sequence with the first mentioned switch means by such wheels passing over the treadle, and relay circuits interconnecting the second mentioned switch means for distinguishing the direction of passage between forward and reverse directions, and circuit means operated jointly by said first named circuits and said relay circuits to provide an output classifying traffic according to the combination of its direction and its actuation of individual and adjacent sections and of spaced sections respectively.

14. In a traffic classification apparatus, a treadle switch assembly having a multiplicity of relatively short sections arranged side by side along its length which is suitable for substantial coverage of a traffic path transverse to such path, and three switches in each of said sections and arranged transverse to the length of said treadle assembly for actuation in overlapping sequence by a wheel rolling thereover, said switches extending relatively close to the edges of the section for actuation of the switches of either of two adjacent sections by a wheel rolling along a line between adjacent sections.

15. Traffic classification apparatus including a treadle adapted to extend across a path of traffic and having a multiplicity of switch units along the length of the treadle, said switch unit having a short width and a close spacing transverse to said traffic path such that less than three adjacent switch units will be actuated primarily by a single wheel rolling thereover along said path and spaced switch units separated by at least one intervening switch unit will be actuated primarily by dual wheels rolling thereover along said path, make contacts associated with each switch unit to be operated by actuation of such unit, a relay circuit including a make contact of one switch unit, and a make contact in a switch unit spaced from said one switch unit, and a relay coil in series, a second relay circuit including a make contact in said one switch unit alone and another relay coil in series, a dual wheel output circuit including a make contact operated by the relay coil of the first relay circuit, and a single wheel output circuit including a make contact operated by the relay coil of the second relay circuit in series with a break contact operated by the relay coil of the first relay circuit.

16. Traffic classification apparatus including a switch treadle adapted to be disposed lengthwise transverse to a traffic path and sectionalized along its length, switch means in each section to be actuated by a vehicle wheel rolling thereover, a relay for each section connected to be operated by actuation of the switch means of its associated section, a set of contacts for each of said relays to be operated by operation of the associated relay, and two sets of circuits interconnecting the relay contacts of adjacent sections and nearby sections to provide one output circuit for identification of single wheel actuation primarily by actuation of the relay contacts of one section alone and by concurrent actuation of the relay contacts of adjacent sections and to provide another output circuit for identification of dual wheel actuation primarily by concurrent actuation of the relay contacts of nearby sections spaced by an intervening section.

17. Traffic counting apparatus including a treadle adapted to be disposed transversely to a path of traffic, switch means in said treadle and circuit means associated therewith for actuation by traffic proceeding along said path and including a forward actuation output circuit for actuation only by traffic proceeding in one direction and a reverse actuation output circuit for actuation only by traffic proceeding in the opposite direction, a counting circuit, a multi-step chain relay circuit connected between said output circuits and said counter circuit to store successive reverse actuations of the reverse output circuit in successive steps of said chain relay circuit and to release such stored reverse actuations successively by succeeding forward actuations of the forward output circuit, and providing a connection for operation of said counter circuit only by actuation of said forward output circuit when all such stored reverse actuations have been so released.

GEORGE A. NAGEL.

REFERENCES CITED

The following references are of record in the file of this patent:

UNITED STATES PATENTS

| Number | Name | Date |
| --- | --- | --- |
| 2,166,090 | Cooper | July 11, 1939 |
| 2,205,555 | Cooper | June 25, 1940 |
| 2,268,925 | Cooper | Jan. 6, 1942 |
| 2,287,090 | Cooper | June 23, 1942 |
| 2,311,359 | Barker | Feb. 16, 1943 |
| 2,311,360 | Barker | Feb. 16, 1943 |
| 2,313,627 | Cooper | Mar. 9, 1943 |
| 2,319,153 | Nolde | May 11, 1943 |
| 2,330,872 | Diebold | Oct. 5, 1943 |
| 2,343,989 | May et al. | Mar. 14, 1944 |

FOREIGN PATENTS

| Number | Country | Date |
| --- | --- | --- |
| 554,985 | Germany | July 16, 1932 |